(12) United States Patent
Masluk

(10) Patent No.: US 11,973,256 B2
(45) Date of Patent: Apr. 30, 2024

(54) HIGH-DENSITY EMBEDDED BROADSIDE-COUPLED ATTENUATORS

(71) Applicant: International Business Machines Corporation, Armonk, NY (US)

(72) Inventor: Nicholas A Masluk, Putnam Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 46 days.

(21) Appl. No.: 17/656,678

(22) Filed: Mar. 28, 2022

(65) Prior Publication Data
US 2023/0307811 A1    Sep. 28, 2023

(51) Int. Cl.
| H01P 1/22 | (2006.01) |
| H01P 1/26 | (2006.01) |
| H01P 1/30 | (2006.01) |
| H01P 3/08 | (2006.01) |
| H01P 5/18 | (2006.01) |
| H01P 11/00 | (2006.01) |

(52) U.S. Cl.
CPC ............. *H01P 1/227* (2013.01); *H01P 1/268* (2013.01); *H01P 1/30* (2013.01); *H01P 3/081* (2013.01); *H01P 5/187* (2013.01); *H01P 11/003* (2013.01)

(58) Field of Classification Search
CPC .......... H01P 5/187; H01P 5/186; H01P 5/185; H01P 5/184; H01P 5/18; H01P 5/12; H01P 5/16; H01P 1/227; H01P 1/268; H01P 1/30; H01P 1/22; H01P 1/225; H01P 1/18; H01P 1/184; H01P 1/185; H01P 3/081; H01P 11/003
See application file for complete search history.

(56) References Cited

U.S. PATENT DOCUMENTS

| 3,764,941 A | 10/1973 | Nick |
| 4,375,053 A | 2/1983 | Viola et al. |
| 5,543,386 A | 8/1996 | Findikoglu et al. |
| 8,094,430 B2 | 1/2012 | Horowitz et al. |

(Continued)

FOREIGN PATENT DOCUMENTS

| CN | 101728620 B | 2/2013 |
| CN | 102403560 B | 10/2016 |

(Continued)

OTHER PUBLICATIONS microwaves101.com | "Stripline", webpage https://www.microwaves101.com/encyclopedias/stripline, last accessed Jan. 4, 2022.

(Continued)

*Primary Examiner* — Stephen E. Jones
(74) *Attorney, Agent, or Firm* — Amin, Turocy & Watson, LLP

(57) ABSTRACT

Systems and techniques that facilitate high-density embedded broadside-coupled attenuators are provided. In various embodiments, an attenuator can comprise an output line. In various aspects, the attenuator can further comprise a reflectively-terminated input line that is broadside coupled to the output line. In various instances, a downstream end of the reflectively-terminated input line can be shorted to ground. In other instances, a downstream end of the reflectively-terminated input line can be open from ground. In various cases, the output line can exhibit a non-looped-back-layout.

25 Claims, 18 Drawing Sheets

(56) References Cited

U.S. PATENT DOCUMENTS

| | | |
|---|---|---|
| 8,330,555 B2 | 12/2012 | Yoshikawa et al. |
| 9,184,483 B2 | 11/2015 | Zellet et al. |
| 10,176,431 B2 | 1/2019 | Yeh et al. |
| 10,509,054 B2 | 12/2019 | Jordan et al. |
| 10,964,993 B2 | 3/2021 | Olivandese et al. |
| 2003/0132813 A1 | 7/2003 | Gottschalk et al. |
| 2008/0273288 A1 | 11/2008 | Horowitz et al. |
| 2010/0219915 A1 | 9/2010 | Yoshikawa et al. |
| 2013/0293317 A1 | 11/2013 | Zeller et al. |
| 2017/0257074 A1 | 9/2017 | Yeh et al. |
| 2018/0299488 A1 | 10/2018 | Jordan et al. |
| 2020/0036072 A1 | 1/2020 | Olibadese et al. |
| 2022/0045416 A1 | 2/2022 | Naaman |

FOREIGN PATENT DOCUMENTS

| | | |
|---|---|---|
| CN | 110197942 B | 4/2021 |
| KR | 20090072461 A | 7/2009 |
| KR | 100956665 B1 | 5/2010 |
| TW | 201411927 A | 3/2014 |
| TW | 201731154 A | 9/2017 |

OTHER PUBLICATIONS

Keysight Support | "Broadside Coupled Lines", webpage https://edadocs.software.keysight.com/display/genesys2009/Broadside+Coupled+Lines, last accessed Feb. 9, 2022.

Chen et al. | "Design of an UWB bandpass filter using microstrip-coplanar transition structure with composite CPW open/short-circuited resonators," 2008 International Conference on Microwave and Millimeter Wave Technology, 2008, pp. 366-368, doi: 10.1109/ICMMT.2008.4540389, 3 pages.

Mell et al., "The NIST Definition of Cloud Computing," Recommendations of the National Institute of Standards and Technology, NIST Special Publication 800-145, Sep. 2011, 7 pages.

International Search Report and Written Opinion received for PCT Application Serial No. PCT/EP2023/057764 dated Jun. 5, 2023, 14 pages.

Engels et al., "Design of Quasi-ideal Couplers Using Multilayer Mmic Technology", IEEE MTT-S International Microwave Symposium Digest, Jun. 17, 1996, 1181-1184.

Office Action received for Taiwan Patent Application Serial No. 11221265820 dated Dec. 18, 2023, 8 pages (Original Copy only).

HIGH-DENSITY EMBEDDED BROADSIDE-COUPLED ATTENUATORS

BACKGROUND

The subject disclosure relates to attenuators, and more specifically to high-density embedded broadside-coupled attenuators.

When transmitting a control signal to a superconducting qubit, the control signal can pass through one or more broadside-coupled attenuators to facilitate noise reduction. Unfortunately, low-density broadside-coupled attenuators take up significant amounts of physical space, which can degrade the pitch of the control signal. Accordingly, systems and/or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus, and/or computer program products that can facilitate high-density embedded broadside-coupled attenuators are described.

According to one or more embodiments, an apparatus is provided. In various aspects, the apparatus can comprise an output line. In various instances, the apparatus can further comprise a reflectively-terminated input line that is broadside-coupled to the output line. In various cases, a downstream end of the reflectively-terminated input line can be shorted to ground. In other cases, a downstream end of the reflectively-terminated input line can be open from ground. In various aspects, the output line can exhibit a non-looped-back layout.

According to one or more embodiments, an attenuator is provided. In various aspects, the attenuator can comprise an output stripline transmission wire. In various instances, the attenuator can further comprise a reflectively-terminated input stripline transmission wire that is broadside-coupled to the output stripline transmission wire. In various cases, the reflectively-terminated input stripline transmission wire can be a trace between a ground, and a downstream end of the trace can be shorted to the ground. In other cases, the reflectively-terminated input stripline transmission wire can be a trace between a ground, and a downstream end of the trace can be electrically disconnected from the ground. In various aspects, the output stripline transmission wire can exhibit a non-looped-back layout.

According to one or more embodiments, a device is provided. In various aspects, the device can comprise a qubit. In various instances, the device can further comprise an output line that is coupled to the qubit. In various cases, the device can further comprise a reflectively-terminated input line that is broadside-coupled to the output line. In various aspects, the reflective-terminated input line can be coupled to a signal generator. In various instances, a downstream end of the reflectively-terminated input line can be shorted to ground. In various other instances, a downstream end of the reflectively-terminated input line can be open from ground. In various cases, the output line can exhibit a non-looped-back arrangement.

In various embodiments, the above-described apparatus, attenuator, and/or device can be implemented as methods of manufacture.

DETAILED DESCRIPTION

Figure 1:
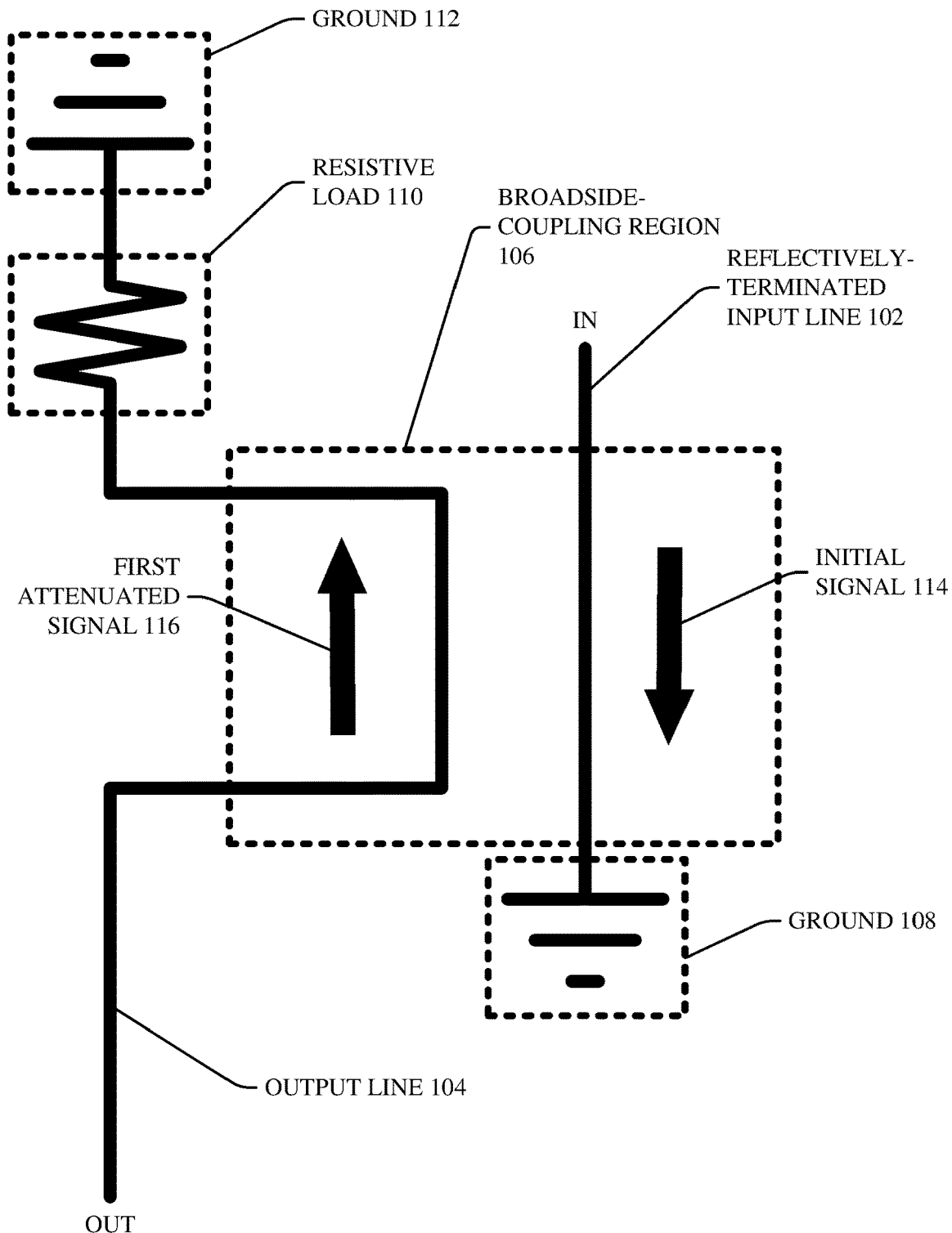
FIGS. 1-2 illustrate circuit diagrams of an example, non-limiting high-density embedded broadside-coupled attenuator utilizing a shorted reflective-termination in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

When transmitting a control signal (e.g., a microwave tone and/or pulse) to a superconducting qubit, the control signal can pass through one or more broadside-coupled attenuators (e.g., directional couplers where two of four ports are terminated), so as to facilitate noise reduction. As those having ordinary skill in the art will appreciate, by using a broadside-coupled attenuator (e.g., by using a directional coupler) rather than a purely resistive attenuator, the bulk of attenuated power can be dissipated in a load that is different from the load seen by the system following the attenuator, which can result in a thermal noise performance that exceeds (e.g., that is better than) purely resistive attenuators.

For example, any suitable waveform generator (e.g., a voltage oscillator) can be coupled to any suitable superconducting qubit (e.g., a transmon qubit) by any suitable driveline cable (e.g., a coaxial cable having a single channel, and/or a flex cable having multiple parallel stripline channels). Moreover, the superconducting qubit can be physically located within a cryogenic temperature chamber (e.g., superconducting properties tend to be most prevalent at cryogenic temperatures), while the waveform generator can be physically located within a non-cryogenic temperature chamber (e.g., signal generation circuitry and/or other control circuitry is often implemented at room-temperature). Because the waveform generator can be physically located within a non-cryogenic temperature chamber (e.g., can be at room-temperature), a control signal created by the waveform generator can include an excessive amount of noise. It can be undesirable to expose the superconducting qubit to such noise. Accordingly, one or more broadside-coupled attenuators (e.g., one or more cold broadside-coupled attenuators) can be embedded within the driveline cable to address such noise. More specifically, as the control signal propagates along the driveline cable, the control signal can sequentially pass through each of the one or more broadside-coupled attenuators, and each of such one or more broadside-coupled attenuators can reduce (e.g., attenuate) both the noise and the amplitude of the control signal. The result can be that, when the control signal reaches the superconducting qubit (e.g., at the end of the driveline cable), the control signal can have very little noise, at the cost of also having a significantly reduced amplitude. To address the issue of amplitude reduction, the waveform generator can controllably set the initial amplitude of the control signal to any suitable value (e.g., can cause the control signal to have a very large initial amplitude), so as to ensure that the final, attenuated amplitude of the control signal (e.g., after passing through the one or more broadside-coupled attenuators) can be at any suitable desired level.

Unfortunately, broadside-coupled attenuators (e.g., directional couplers) can often be constructed and/or otherwise configured in low-density fashion (e.g., in a fashion that is not amenable to high signal density). In other words, a low-density broadside-coupled attenuator can take up a significant amount of physical space, which can degrade and/or otherwise negatively affect the pitch of a control signal that passes through the attenuator. In particular, a low-density broadside-coupled attenuator can include an input line (e.g., an input stripline transmission wire) whose downstream end is coupled to ground by a resistor, and can further include an output line (e.g., an output stripline transmission wire) that is broadside-coupled to the input line and that exhibits a looped-back arrangement and/or layout.

The output line of the low-density broadside-coupled attenuator exhibits the looped-back arrangement/layout due to the nature of broadside-coupling (e.g., due to the nature of parallel coupled transmission lines having strong near-end crosstalk and weak far-end crosstalk). More specifically, broadside-coupling between the input line and the output line can be facilitated by positioning a broadside (e.g., as opposed to an edge) portion of the input line in spatial proximity to a broadside portion of the output line. In some cases, the broadside portion of the input line and the broadside portion of the output line can run substantially in parallel with each other and can be separated by any suitable dielectric material and/or any suitable physical distance. In any case, the spatial proximity can cause near-end crosstalk to occur between the broadside portion of the input line and the broadside portion of the output line. In other words, a control signal that propagates along the input line in a direction that leads away from the signal generator and toward the superconducting qubit can cause, via near-end crosstalk, an attenuated signal to begin propagating along the output line. However, due to such near-end cross talk, the attenuated signal can propagate in a direction opposite to the direction in which the control signal is propagating. Thus, since the control signal is propagating along the input line toward the superconducting qubit and away from the waveform generator, the attenuated signal can begin propagating along the output line toward the waveform generator and away from the superconducting qubit. To ensure that the attenuated signal instead propagates toward the superconducting qubit and away from the waveform generator, the output line can be physically looped-back (e.g., physically rerouted into a loop and/or a turn; physically folded over on itself). In any case, the control signal can be dissipated by the resistor that couples the input line to ground, and the attenuated signal can proceed toward the superconducting qubit thanks to the looped-back arrangement of the output line.

Unfortunately, such looped-back arrangement of the output line can have an excessively large physical footprint and/or can otherwise be considered as consuming too much space. That is, a low-density broadside-coupled attenuator that is embedded within a driveline cable can cause the driveline cable to be physically thicker at the location of the attenuator. Such increased thickness can waste space and/or can negatively influence (e.g., can increase) control signal pitch, which can be undesirable.

Accordingly, systems and/or techniques that can address one or more of these technical problems can be desirable.

Various embodiments described herein can address one or more of these technical problems. Specifically, various embodiments described herein can provide systems and/or techniques that can facilitate high-density embedded broadside-coupled attenuators. In other words, the present inventors of various embodiments described herein devised an architecture for a broadside-coupled attenuator (e.g., for a directional coupler) that can take up less physical space (e.g., that is denser and/or more geometrically compact) than the architectures of low-density broadside-coupled attenuators and/or that can maintain the beneficial thermal noise performance of such low-density broadside-coupled attenuators. More specifically, the present inventors devised a technique for constructing a broadside-coupled attenuator that lacks and/or otherwise does not require a looped-back output line.

In particular, the architecture devised by the present inventors can, in various aspects, include an output line (e.g., any suitable output stripline transmission wire) and an input line (e.g., any suitable input stripline transmission wire) that are broadside-coupled to each other, where an upstream end of the output line can be coupled to ground by any suitable resistor, and/or where the input line can be reflectively-terminated rather than resistively-terminated. In other words, a downstream end of the input line can be not coupled to ground by a resistor. Instead, the downstream end of the input line can, in some cases, be shorted to ground (e.g., can be coupled directly to ground without any appreciable resistive load), and/or can, in other cases, be open from ground (e.g., can be electrically disconnected from ground and/or can otherwise be separated from ground by a circuit break). In any case, when the downstream end of the input line is shorted to ground or is separated from ground by a circuit break, the downstream end of the input line can be considered as being reflectively-terminated and/or as otherwise having a reflective-termination. That is, when a signal that is propagating along the input line reaches the reflective-termination (e.g., reaches the short, and/or reaches the circuit break), the signal can reverse course (e.g., can be reflected) so as to now be propagating along the input line in a direction that is opposite to its prior direction of propagation. In various aspects, the present inventors realized that such a reflective-termination can be leveraged to eliminate the need to loop-back the output line.

For example, suppose that a control signal propagates along the input line in a downstream direction (e.g., in a direction that leads toward a superconducting qubit and away from a waveform generator). As the control signal passes through the portion of the input line that is broadside-coupled to the output line, near-end crosstalk can occur between the input line and the output line. Such near-end crosstalk can cause a first attenuated signal (e.g., a signal that has lower noise and/or lower amplitude than the control signal) to begin propagating along the output line in a direction that is opposite to the direction of propagation of the control signal. Thus, since the control signal can, at this point in time, be propagating in the downstream direction, the first attenuated signal can instead be propagating in an upstream direction (e.g., in a direction that leads toward the waveform generator and away from the superconducting qubit). Because the upstream end of the output line can be coupled to ground by the resistor, the first attenuated signal can be dissipated by the resistor.

At some point in time, the control signal, which is still traveling along the input line in the downstream direction, can reach the reflective-termination of the input line. In various aspects, when the control signal encounters the reflective-termination (e.g., when the control signal encounters the short and/or the circuit break), the control signal can be reflected backward and thus can begin propagating along the input line in the upstream direction (e.g., toward the waveform generator and away from the superconducting qubit). In various instances, the reflected control signal can pass through the portion of the input line that is broadside-coupled to the output line, which can, again, cause near-end crosstalk to occur between the input line and the output line. Such near-end crosstalk can cause a second attenuated signal (e.g., a signal that has lower noise and/or lower amplitude than the reflected control signal) to begin propagating along the output line in a direction that is opposite to the direction of propagation of the reflected control signal. So, since the reflected control signal can, at this point in time, propagate in the upstream direction, the second attenuated signal can instead propagate in the downstream direction. That is, the second attenuated signal can travel along the output line toward the superconducting qubit and away from the waveform generator.

Note that this downstream direction of propagation of the second attenuated signal can be achieved without physically looping-back and/or physically turning the output line. In other words, by implementing a reflectively-terminated input line, the need for a looped-back output line can be eliminated. In still other words, a broadside-coupled attenuator that includes a reflectively-terminated input line can be considered as more dense, as more geometrically compact, and/or as otherwise having a smaller physical footprint than a low-density broadside-coupled attenuator. In various cases, such higher density, higher geometric compactness, and/or smaller physical footprint of broadside-coupled attenuators described herein can result in less pitch degradation of control signals.

Thus, various embodiments described herein can be considered as a system and/or technique that can significantly reduce the physical size of, and thus the pitch degradation associated with, broadside-coupled attenuators.

Various embodiments of the invention can be employed to use hardware and/or software to solve problems that are highly technical in nature (e.g., to facilitate high-density embedded broadside-coupled attenuators), that are not abstract, that are not mere laws of nature, that are not mere natural phenomena, and that cannot be performed as a set of mental acts by a human. Instead, various embodiments described herein include tangible electric circuit structures/architectures and/or methodologies pertaining to such tangible electric circuit structures/architectures that can be implemented so as to reduce the physical size and/or spatial footprint of broadside-coupled attenuators. Indeed, as mentioned above, broadside-coupled attenuators can often be constructed in low-density fashion, with a looped-back output line. Such looped-back output line can consume a significant amount of physical space and/or can negatively influence control signal pitch. Unfortunately, existing systems/techniques do not offer any solution to these technical problems.

In contrast, various embodiments described herein can address one or more of such technical problems. Specifically, systems/techniques described herein can include constructing a broadside-coupled attenuator to have a reflectively-terminated input line. In various instances, the reflectively-terminated input line can dispense with the need for a looped-back output line. More specifically, a control signal that is propagating along the reflectively-terminated input line in a downstream direction can encounter the reflective-termination (e.g., a short and/or a circuit break), which can cause the control signal to be reflected backward. In other words, the reflective-termination can cause the control signal to now be propagating along the reflectively-terminated input line in an upstream direction. When the reflected control signal passes through a portion of the reflectively-terminated input line that is broadside-coupled to an output line, near-end crosstalk can occur, which can cause an attenuated signal to begin propagating along the output line in a downstream direction. Since the attenuated signal is already propagating in the downstream direction, there can be no need to physically loop-back and/or turn the output line. In various aspects, such a broadside-coupled attenuator can be considered as having a higher density, a higher level of spatial/geometric compactness, and/or as taking up less physical space than a low-density broadside-coupled attenuator. Accordingly, such a broadside-coupled attenuator can experience and/or be associated with less pitch degradation than low-density broadside-coupled attenuators. Because various embodiments described herein can mitigate the problems (e.g., excessive spatial footprint, pitch degradation) associated with low-density broadside-coupled attenuators, such embodiments certainly constitute a concrete and tangible technical improvement in the field of attenuators.

Moreover, it must be emphasized that various embodiments described herein are not directed to mere transitory signals and/or propagating waveforms. As explained herein, various embodiments can solve the technical problems of excessive spatial consumption and/or pitch degradation that are associated with low-density broadside-coupled attenuators. Specifically, as described herein, the present inventors devised a solution to these technical problems, where such solution includes constructing a broadside-coupled attenuator so as to have a reflectively-terminated input line. As explained herein, the inclusion of a reflectively-terminated input line can eliminate the need for a looped-back output line. In particular, this is due to how a reflective-termination (e.g., a short and/or a circuit break) can influence the direction of propagation of a control signal. Accordingly, various embodiments described herein cannot be intelligently explained without discussing/describing control signals (e.g., microwave tones/pulses) and/or directions of propagation of such control signals. Despite such description/discussion of control signals, various embodiments described herein are not directed to such control signals without significantly more. Instead, such embodiments are directed to the concrete, tangible, and non-transitory circuit structures/architectures that manipulate and/or guide such control signals (e.g., an output stripline transmission wire that is broadside-coupled to a reflectively-terminated input stripline transmission wire).

Furthermore, various embodiments described herein can control tangible, hardware-based, and/or software-based devices based on the disclosed teachings. For example, embodiments of the invention can include tangible qubits (e.g., superconducting qubits made up of Josephson junctions) and/or tangible stripline transmission wires that can carry and/or attenuate control signals for such tangible qubits.

It should be appreciated that the figures and the herein disclosure describe non-limiting examples of various embodiments. It should further be appreciated that the figures are not necessarily drawn to scale.

Figure 2:
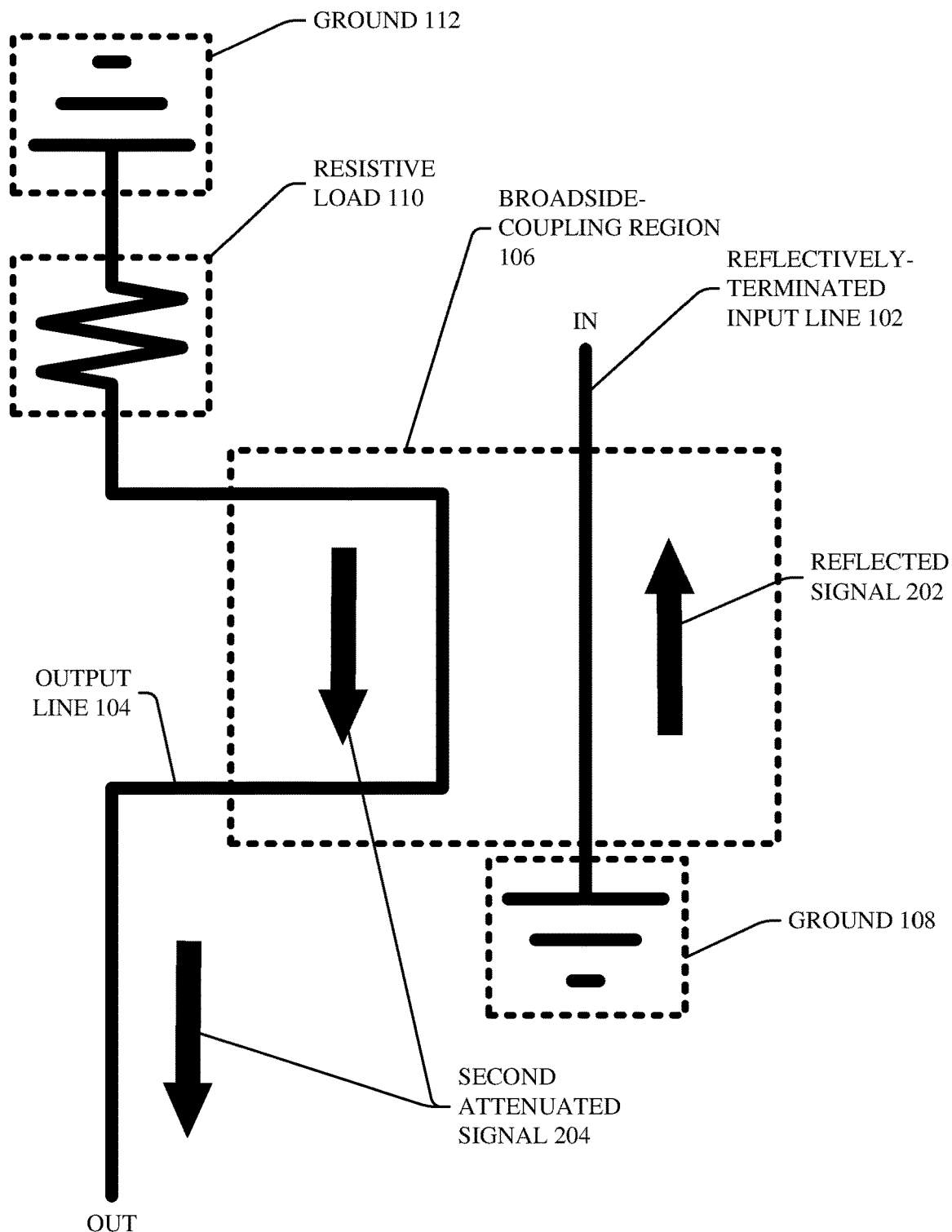

FIGS. 1-2 illustrate circuit diagrams 100 and 200 of an example, non-limiting high-density embedded broadside-coupled attenuator utilizing a shorted reflective-termination in accordance with one or more embodiments described herein.

As shown in FIG. 1, the high-density embedded broadside-coupled attenuator can, in various aspects, include a reflectively-terminated input line 102 and an output line 104. In various cases, the reflectively-terminated input line 102 can be any suitable cable and/or wire having any suitable dimensions, having any suitable shape, and/or being constructed from any suitable materials (e.g., superconducting materials) for transmitting microwave tones and/or pulses (e.g., the reflectively-terminated input line 102 can be a stripline). Similarly, the output line 104 can be any suitable cable and/or wire having any suitable dimensions, having any suitable shape, and/or being constructed from any suitable materials (e.g., superconducting materials) for transmitting microwave tones and/or pulses (e.g., the output line 104 can also be a stripline).

In various cases, the reflectively-terminated input line 102 can have a first end (e.g., an upstream end) that is denoted by "IN" as shown in FIG. 1. Moreover, the reflectively-terminated input line 102 can have a second end (e.g., a downstream end) that is shorted to a ground 108, hence the name "reflectively-terminated" (e.g., a short can be considered as a reflective-termination).

In various aspects, the output line 104 can have a first end (e.g., an upstream end) that is coupled to a ground 112 by a resistive load 110. In various instances, the ground 112 and the ground 108 can be common. In various cases, the resistive load 110 can be constructed from any suitable resistors and/or resistive films (e.g., can have any suitable resistance value). In various aspects, the output line 104 can have a second end (e.g., a downstream end) that is denoted by "OUT" as shown in FIG. 1.

As also shown, a portion of the reflectively-terminated input line 102 can be in spatial proximity (e.g., can be within any suitable physical distance of and/or can run substantially parallel to) a corresponding portion of the output line 104. Such spatial proximity can cause the reflectively-terminated input line 102 to become broadside-coupled to the output line 104. This can be denoted in FIG. 1 as a broadside-coupling region 106.

In various aspects, the high-density embedded broadside-coupled attenuator shown in FIG. 1 can operate and/or function as follows. An initial signal 114 can propagate along the reflectively-terminated input line 102. In particular, the initial signal 114 can be received at the first end of the reflectively-terminated input line 102 and can propagate toward the short to ground 108. The initial signal 114, which can be generated by any suitable waveform generator (not shown), can be any suitable microwave tone and/or pulse (e.g., can have any suitable amplitude, frequency, and/or duration). In various aspects, as the initial signal 114 propagates along the reflectively-terminated input line 102, the initial signal 114 can pass through the portion of the reflectively-terminated input line 102 that is broadside-coupled to the output line 104 (e.g., can pass through the broadside-coupling region 106). This can result in near-end crosstalk occurring between the reflectively-terminated input line 102 and the output line 104, which can cause a first attenuated signal 116 to begin propagating along the output line 104. In various aspects, due to such near-end crosstalk, the first attenuated signal 116 can have a corresponding (e.g., same) frequency and/or duration as the initial signal 114, but the first attenuated signal 116 can have less noise and/or less amplitude than the initial signal 114. Moreover, due to such near-end crosstalk and as shown in FIG. 1, the first attenuated signal 116 can propagate in a direction that is opposite to the direction in which the initial signal 114 propagates. Thus, since the initial signal 114 can propagate along the reflectively-terminated input line 102 in a downward direction from the perspective of FIG. 1 (e.g., in a downstream direction), the first attenuated signal 116 can propagate along the output line 104 in an upward direction from the perspective of FIG. 1 (e.g., in an upstream direction). In various cases, the first attenuated signal 116 can eventually encounter and be dissipated by the resistive load 110. Moreover, in various instances, the initial signal 114 can eventually encounter the short to the ground 108. Because the short to the ground 108 can be considered as a reflective-termination, the initial signal 114 can be reflected backward by the short to the ground 108. This is shown in more detail with respect to FIG. 2.

As shown, FIG. 2 depicts the same high-density embedded broadside-coupled attenuator that is depicted in FIG. 1, after the initial signal 114 has been reflected backward by the short to the ground 108. More specifically, a reflected signal 202 can be considered as the resulting microwave tone and/or pulse that is obtained when the initial signal 114 is reflected backward by the short to the ground 108. In various aspects, the reflected signal 202 can have a corresponding (e.g., same) amplitude, frequency, and/or duration as the initial signal 114, but the reflected signal 202 can have an opposite direction of propagation than the initial signal 114. That is, the reflected signal 202 can propagate along the reflectively-terminated input line 102 in an upstream direction, whereas the initial signal 114 was propagating along the reflectively-terminated input line 102 in a downstream direction. In any case, as the reflected signal 202 propagates along the reflectively-terminated input line 102, the reflected signal 202 can pass through the portion of the reflectively-terminated input line 102 that is broadside-coupled to the output line 104 (e.g., can pass through the broadside-coupling region 106). This can (again) result in near-end crosstalk occurring between the reflectively-terminated input line 102 and the output line 104, which can cause a second attenuated signal 204 to begin propagating along the output line 104. In various aspects, due to such near-end crosstalk, the second attenuated signal 204 can have a corresponding (e.g., same) frequency and/or duration as the reflected signal 202, but the second attenuated signal 204 can have less noise and/or less amplitude than the reflected signal 202. Moreover, due to such near-end crosstalk and as shown in FIG. 2, the second attenuated signal 204 can propagate in a direction that is opposite to the direction in which the reflected signal 202 propagates. Thus, since the reflected signal 202 propagates along the reflectively-terminated input line 102 in an upward direction from the perspective of FIG. 2 (e.g., in an upstream direction), the second attenuated signal 204 can propagate along the output line 104 in a downward direction from the perspective of FIG. 2 (e.g., in a downstream direction). In other words, the second attenuated signal 204 can propagate along the output line 104 in a direction that leads away from the point of origin of the initial signal 114 (e.g., can propagate toward the "OUT" denotation of FIG. 2).

Note that the high-density embedded broadside-coupled attenuator depicted in FIGS. 1-2 can cause the second attenuated signal 204 to propagate in the same direction as the initial signal 114 (e.g., away from the point of origin of the initial signal 114, and/or toward any suitable signal-receiving device such as a qubit), without requiring the output line 104 to be looped-back and/or otherwise rerouted around. Specifically, the inclusion of the short to the ground 108 can dispense with and/or otherwise eliminate the need for looping-back the output line 104. Therefore, the high-density embedded broadside-coupled attenuator shown in FIGS. 1-2 can be considered as more geometrically compact and/or as taking up less physical space (e.g., hence the name "high-density") than a low-density embedded broadside-coupled attenuator. Accordingly, the second attenuated signal 204 can experience less pitch degradation than would otherwise be possible. For at least these reasons, the high-density embedded broadside-coupled attenuator shown in FIGS. 1-2 can be considered as ameliorating various technical problems that plague low-density embedded broadside-coupled attenuators.

Figure 3:
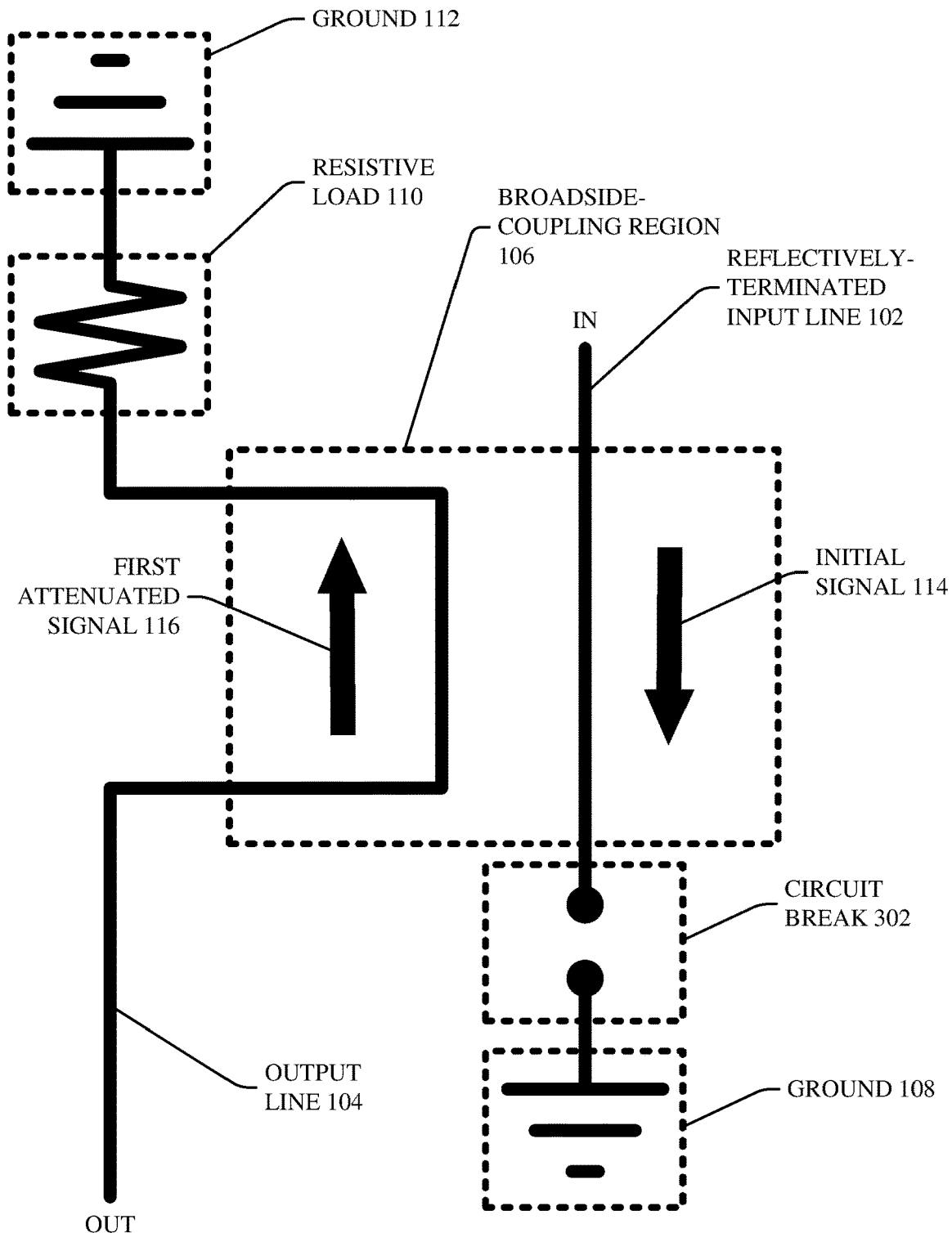
FIGS. 3-4 illustrate circuit diagrams of an example, non-limiting high-density embedded broadside-coupled attenuator utilizing an open reflective-termination in accordance with one or more embodiments described herein.
Figure 4:
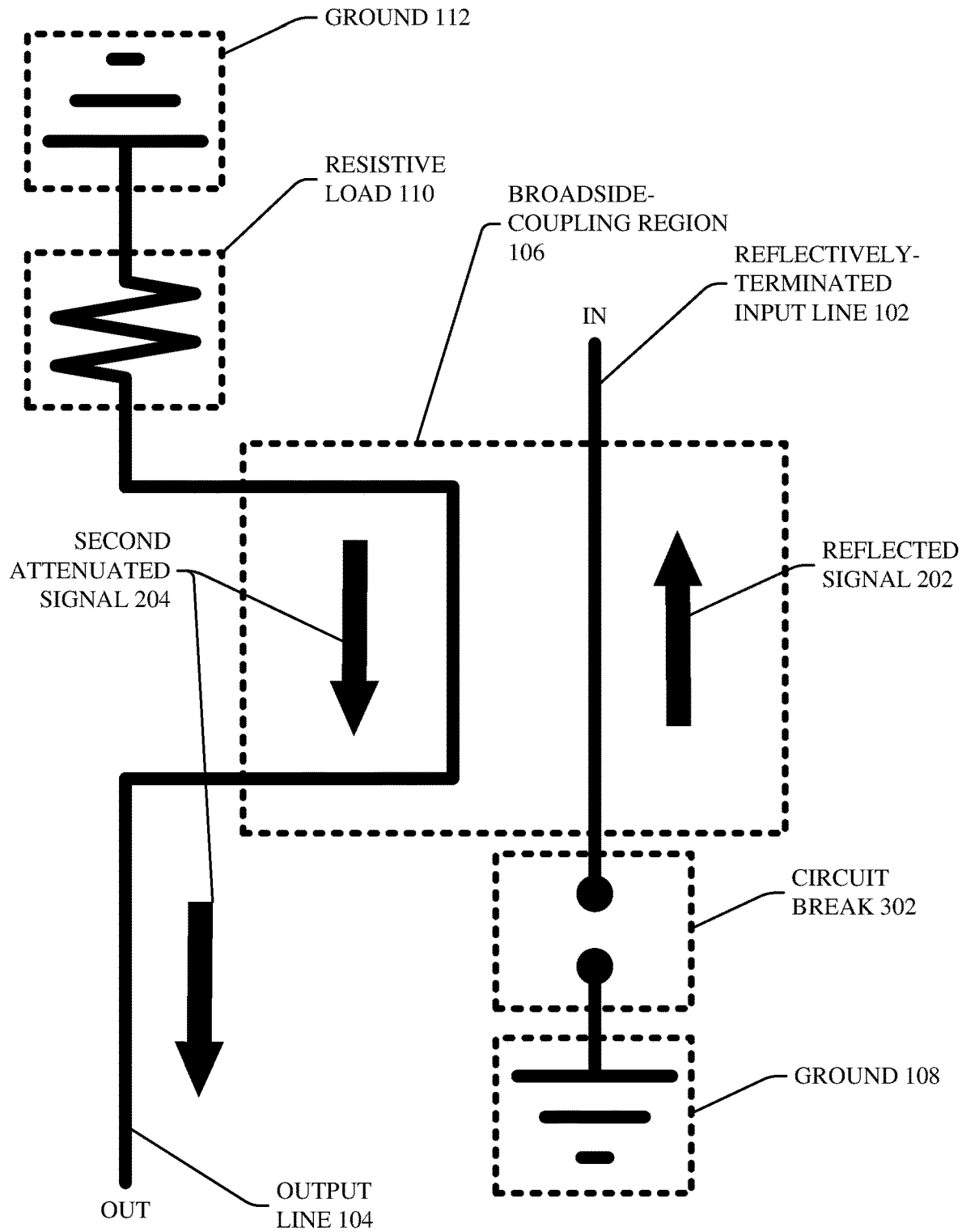

FIGS. 3-4 illustrate circuit diagrams 300 and 400 of an example, non-limiting high-density embedded broadside-coupled attenuator utilizing an open reflective-termination in accordance with one or more embodiments described herein. In other words, FIGS. 3-4 illustrate an alternative construction of a high-density embedded broadside-coupled attenuator.

As shown in FIGS. 3-4, the reflectively-terminated input line 102, the output line 104, the ground 108, the resistive load 110, the ground 112, the broadside-coupling region 106, the initial signal 114, the first attenuated signal 116, the reflected signal 202, and the second attenuated signal 204 can be as described above. In various cases, as shown, a difference between the high-density embedded broadside-coupled attenuator shown in FIGS. 1-2 and that shown in FIGS. 3-4 is that, in the high-density embedded broadside-coupled attenuator shown in FIGS. 3-4, the second end (e.g., the downstream end) of the reflectively-terminated input line 102 can be not shorted to the ground 108. Instead, and as illustrated by FIGS. 3-4, the second end (e.g., the downstream end) of the reflectively-terminated input line 102 can, in various aspects, be separated from the ground 108 by a circuit break 302. In other words, the second end of the reflectively-terminated input line 102 can be considered as being open from the ground 108 and/or as otherwise being electrically disconnected from the ground 108. In various instances, the circuit break 302 can be any suitable circuit break.

In any case, the circuit break 302 can be considered as a reflective-termination, just like the short to the ground 108. Accordingly, the high-density embedded broadside-coupled attenuator shown in FIGS. 3-4 can function in a same and/or similar fashion as that shown in FIGS. 1-2. Specifically, the initial signal 114 can be received at the first end (e.g., the upstream end) of the reflectively-terminated input line 102 and can propagate along the reflectively-terminated input line 102 in a downstream direction. As the initial signal 114 passes through the broadside-coupling region 106, near-end crosstalk can occur, which can cause the first attenuated signal 116 to begin propagating along the output line 104 in an upstream direction (e.g., opposite to the direction of propagation of the initial signal 114). Eventually, the first attenuated signal 116 can encounter and be dissipated by the resistive load 110, and the initial signal 114 can encounter the circuit break 302. Upon encountering the circuit break 302, the initial signal 114 can be reflected backward, thereby resulting in the reflected signal 202 as shown in FIG. 4. As the reflected signal 202 passes through the broadside-coupling region 106, near-end crosstalk can again occur, which can cause the second attenuated signal 204 to begin propagating along the output line 104 in a downstream direction (e.g., opposite to the direction of propagation of the reflected signal 202). Again, the result can be that the second attenuated signal 204 can propagate in the same direction as the initial signal 114 (e.g., away from the point of origin of the initial signal 114, and/or toward any suitable signal-receiving device such as a superconducting qubit), without having to loop-back and/or otherwise reroute the output line 104.

Therefore, as FIGS. 1-4 show, the reflectively-terminated input line 102 can, in some cases, be implemented by being shorted to the ground 108 and can, in other cases, be implemented by being left open from the ground 108. In either case, there can be no need to loop-back the output line 104, which can result in a more spatially-compact broadside-coupled attenuator.

FIGS. 5-10 illustrate example, non-limiting block diagrams of a high-density embedded broadside-coupled attenuator in accordance with one or more embodiments described herein. In other words, FIGS. 5-10 show, in a non-limiting fashion, how a high-density embedded broadside-coupled attenuator can be physically constructed and/or manufactured. More specifically, FIGS. 5-10 show, in a non-limiting fashion, how a high-density embedded broadside-coupled attenuator can be physically structured using a four-layer stripline architecture.

Figure 5:
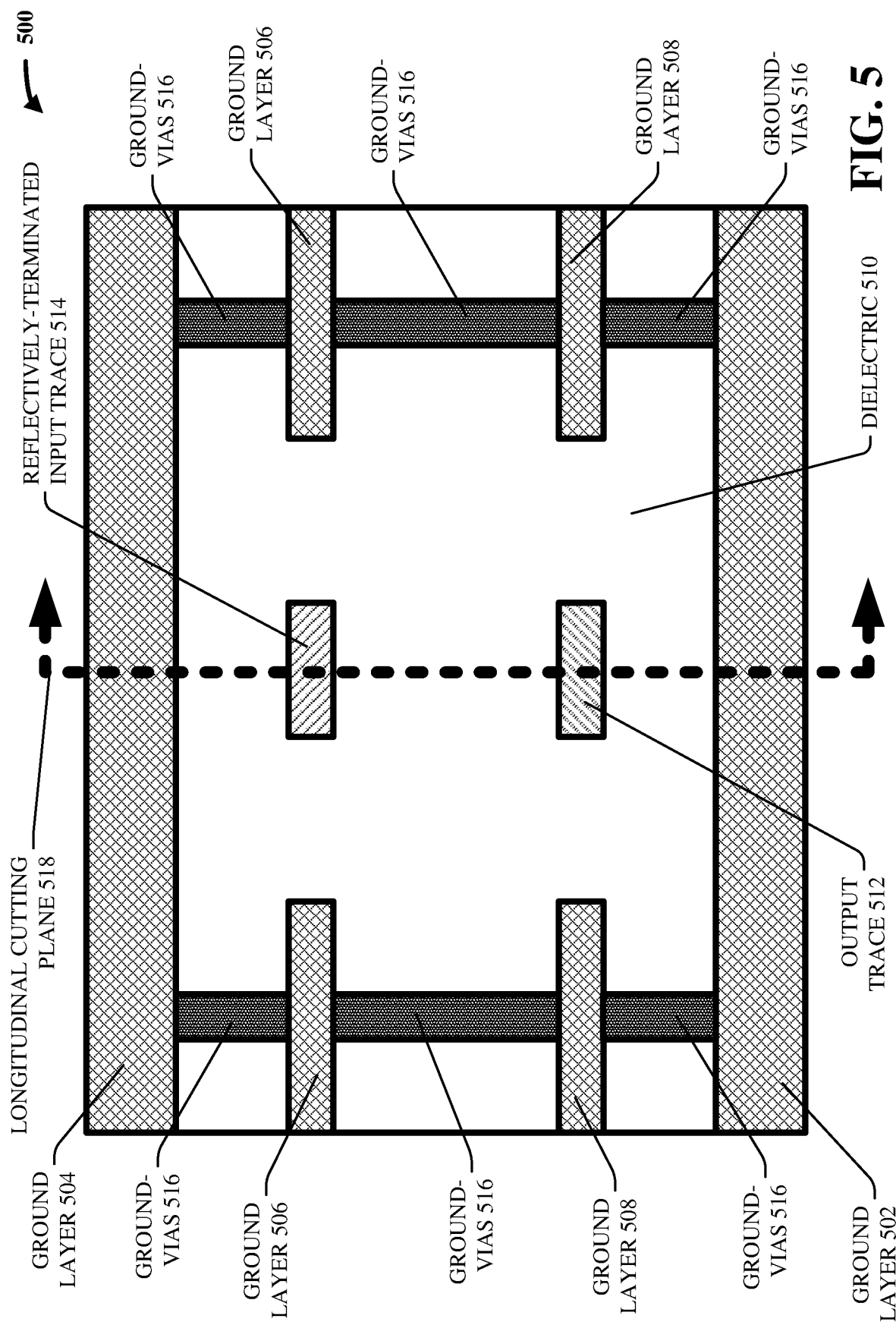
FIGS. 5-10 illustrate example, non-limiting block diagrams of a high-density embedded broadside-coupled attenuator in accordance with one or more embodiments described herein.

In various aspects, FIG. 5 depicts a lateral cross-sectional view 500 of a high-density embedded broadside-coupled attenuator that utilizes a four-layer stripline architecture. In various instances, as shown, a first layer of such four-layer stripline architecture can include a ground layer 502, a second layer of such four-layer stripline architecture can include a ground layer 508 and an output trace 512, a third layer of such four-layer stripline architecture can include a ground layer 506 and a reflectively-terminated input trace 514, and/or a fourth layer of such four-layer stripline architecture can include a ground layer 504.

In various aspects, the ground layer 502 can have any suitable shape, can have any suitable dimensions, and/or can be made up of any suitable materials (e.g., superconducting materials). Likewise, the ground layer 504 can have any suitable shape, can have any suitable dimensions, and/or can be made up of any suitable materials (e.g., superconducting materials). Those having ordinary skill in the art will appreciate that, in various instances, the ground layer 502 and the ground layer 504 can have the same and/or different shapes, same and/or different dimensions, and/or same and/or different materials as each other. In any case, the ground layer 502 and the ground layer 504 can run substantially in parallel to each other in a longitudinal direction (e.g., into-the-page and/or out-of-the-page of FIG. 5).

In various instances, as shown, the ground layer 508, the output trace 512, the ground layer 506, and/or the reflectively-terminated input trace 514 can be sandwiched between the ground layer 502 and the ground layer 504, with interstitial spaces filled by a dielectric 510. In various cases, the dielectric 510 can be any suitable dielectric material and can have any suitable shape and/or dimensions.

In various aspects, the ground layer 506 can have any suitable shape, can have any suitable dimensions, and/or can be made up of any suitable materials (e.g., superconducting materials). Similarly, in various instances, the ground layer 508 can have any suitable shape, can have any suitable dimensions, and/or can be made up of any suitable materials (e.g., superconducting materials). In various aspects, the ground layer 508 and the ground layer 506 can have the same and/or different shapes, same and/or different dimensions, and/or same and/or different materials as each other.

In various instances, as shown, the ground layer 502, the ground layer 504, the ground layer 506, and the ground layer 508 can be coupled together by any suitable number of ground-vias 516. Accordingly, the ground layer 502, the ground layer 504, the ground layer 506, and/or the ground layer 508 can be considered as forming a common ground. In various cases, the ground-vias 516 can have any suitable shapes, can have any suitable dimensions, and/or can be made up of any suitable materials (e.g., superconducting materials). In some aspects, the ground-vias 516 can be made up of the same and/or different materials as the ground layer 502, the ground layer 504, the ground layer 506, and/or the ground layer 508.

In various aspects, as shown, the ground layer 508 can have a longitudinally central cut-out region along which the output trace 512 can run (e.g., the output trace 512 can have a longitudinal direction that extends into-the-page and/or out-of-the-page of FIG. 5). In various instances, the output trace 512 can be any suitable wire and/or cable having any suitable shape, having any suitable dimensions, and/or being made up of any suitable materials (e.g., superconducting materials). In some cases, the output trace 512 can be made up of the same and/or different materials as the ground layer 508. As those having ordinary skill in the art will appreciate, because the output trace 512 can run along the longitudinally central cut-out region of the ground layer 508 and can be sandwiched by the ground layer 502 and/or the ground layer 504 (e.g., because the output trace 512 can longitudinally run between the ground layer 508, the ground layer 502, and/or the ground layer 504), the ground layer 508, the ground layer 502, the ground layer 504, and the output trace 512 can be considered as collectively forming and/or constituting a stripline wire architecture.

Likewise, as shown, the ground layer 506 can have a longitudinally central cut-out region along which the reflectively-terminated input trace 514 can run (e.g., the reflectively-terminated input trace 514 can have a longitudinal direction that extends into-the-page and/or out-of-the-page of FIG. 5). In various instances, the reflectively-terminated input trace 514 can be any suitable wire and/or cable having any suitable shape, having any suitable dimensions, and/or being made up of any suitable materials (e.g., superconducting materials). In some cases, the reflectively-terminated input trace 514 can be made up of the same and/or different materials as the ground layer 506. Furthermore, in various aspects, the reflectively-terminated input trace 514 and the output trace 512 can have the same and/or different shapes, the same and/or different dimensions, and/or the same and/or different materials as each other. As those having ordinary skill in the art will appreciate, because the reflectively-terminated input trace 514 can run along the longitudinally central cut-out region of the ground layer 506 and can be sandwiched by the ground layer 502 and/or the ground layer 504 (e.g., because the reflectively-terminated input trace 514 can longitudinally run between the ground layer 506, the ground layer 502, and/or the ground layer 504), the ground layer 506, the ground layer 502, the ground layer 504, and the reflectively-terminated input trace 514 can be considered as collectively forming and/or constituting a stripline wire architecture.

In various cases, the output trace 512 and the reflectively-terminated input trace 514 can longitudinally run substantially in parallel with each other (e.g., can run substantially in parallel with each other into-the-page and/or out-of-the-page of FIG. 5).

In various aspects, the ground layer 502, the ground layer 504, the ground layer 506, the ground layer 508, and/or the ground-vias 516 can be considered as collectively forming and/or functioning as the ground 108 and/or the ground 112 of FIGS. 1-4. Furthermore, in various instances, the output trace 512 can be considered as forming and/or functioning as the output line 104 of FIGS. 1-4. Further still, in various cases, the reflectively-terminated input trace 514 can be considered as forming and/or functioning as the reflectively-terminated input line 102 of FIGS. 1-4. Indeed, as shown in FIG. 5, a broadside (as opposed to an edge) of the output trace 512 and a broadside of the reflectively-terminated input trace 514 can face each other and can be separated by any suitable amount and/or thickness of the dielectric 510. In other words, a broadside of the output trace 512 and a broadside of the reflectively-terminated input trace 514 can be considered as being in spatial proximity to each other. As those having ordinary skill in the art will appreciate, this can cause near-end crosstalk, and thus broadside-coupling, to occur between the output trace 512 and the reflectively-terminated input trace 514. As those having ordinary skill in the art will further appreciate, the electrical characteristics of such near-end crosstalk and/or of such broadside-coupling (e.g., how much signal attenuation occurs) can depend upon the shapes, dimensions, and/or materials of the reflectively-terminated input trace 514, can depend upon the shapes, dimensions, and/or materials of the output trace 512, can depend upon the distance separating the reflectively-terminated input trace 514 from the output trace 512, and/or can depend upon the dielectric 510. Accordingly, a desired amount of near-end crosstalk (e.g., a desired amount of broadside-coupling) can be facilitated by controllably fabricating the shapes, dimensions, and/or materials of the reflectively-terminated input trace 514, by controllably fabricating the shapes, dimensions, and/or materials of the output trace 512, by controllably fabricating the distance separating the reflectively-terminated input trace 514 from the output trace 512, and/or by controllably fabricating the dielectric 510.

Lastly, FIG. 5 marks a location of a longitudinal cutting plane 518. Various remaining figures (e.g., FIGS. 9-10) depict the four-layer stripline architecture of FIG. 5 along and/or according to the longitudinal cutting plane 518.

Figure 6:
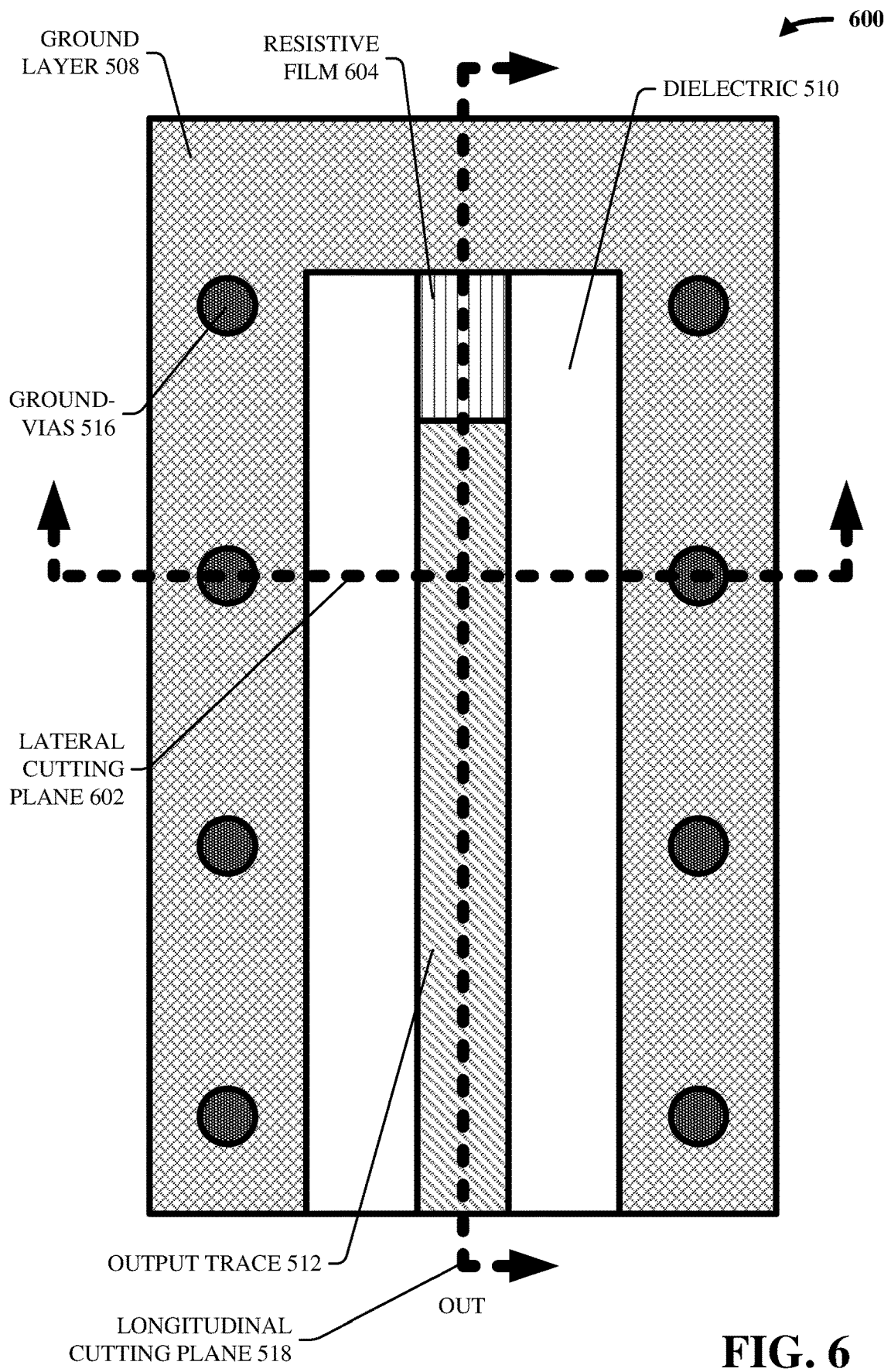

In various aspects, FIG. 6 depicts an aerial longitudinal cross-sectional view 600 of the four-layer stripline architecture that is shown in FIG. 5. More specifically, FIG. 6 illustrates an aerial view of the second layer of the four-layer stripline architecture shown in FIG. 5, which can include the ground layer 508 and the output trace 512. Note that the longitudinal direction of the four-layer stripline architecture can extend in an up-down direction from the perspective of FIG. 6, whereas that same longitudinal direction can extend into-the-page and/or out-of-the page from the perspective of FIG. 5.

As can be seen, FIG. 6 marks the location of a lateral cutting plane 602. In various cases, FIG. 5 can be considered as illustrating the four-layer stripline architecture along and/or according to the lateral cutting plane 602.

As can also be seen, FIG. 6 denotes the location of the longitudinal cutting plane 518, which is also marked in FIG. 5. Again, various remaining figures (e.g., FIGS. 9-10) illustrate the four-layer stripline architecture along and/or according to the longitudinal cutting plane 518.

As can further be seen, FIG. 6 illustrates an aerial view of the longitudinally central cut-out portion of the ground layer 508 through which, along which, and/or between which the output trace 512 can longitudinally run. In various aspects, as shown, a first end (e.g., an upstream end) of the output trace 512 can be coupled to the ground layer 508 by a resistive film 604. In various instances, the resistive film 604 can have any suitable shape, can have any suitable dimensions, and/or can be made up of any suitable electrically resistive materials. In various cases, the resistive film 604 can be considered as forming and/or functioning as the resistive load 110 of FIGS. 1-4. In various aspects, as shown, a second end (e.g., a downstream end) of the output trace 512 can be denoted by "OUT" in FIG. 6. Note that the "OUT" denotation in FIG. 6 can be considered as corresponding to the "OUT" denotation of FIGS. 1-4 (e.g., the downstream end of the output trace 512 that is marked by "OUT" in FIG. 6 can form and/or function as the downstream end of the output line 104 that is marked by "OUT" in FIGS. 1-4).

As can yet further be seen, FIG. 6 illustrates an aerial view of the ground-vias 516. Although FIG. 6 illustrates the ground-vias 516 as having circular cross-sections, this is a mere non-limiting example for ease of illustration. In various cases, the ground-vias 516 can have any suitably-shaped cross-sections. Moreover, although FIG. 6 depicts eight ground-vias 516, this is a mere non-limiting example for ease of illustration. In various cases, any suitable number of ground-vias 516 can be implemented.

Figure 7:
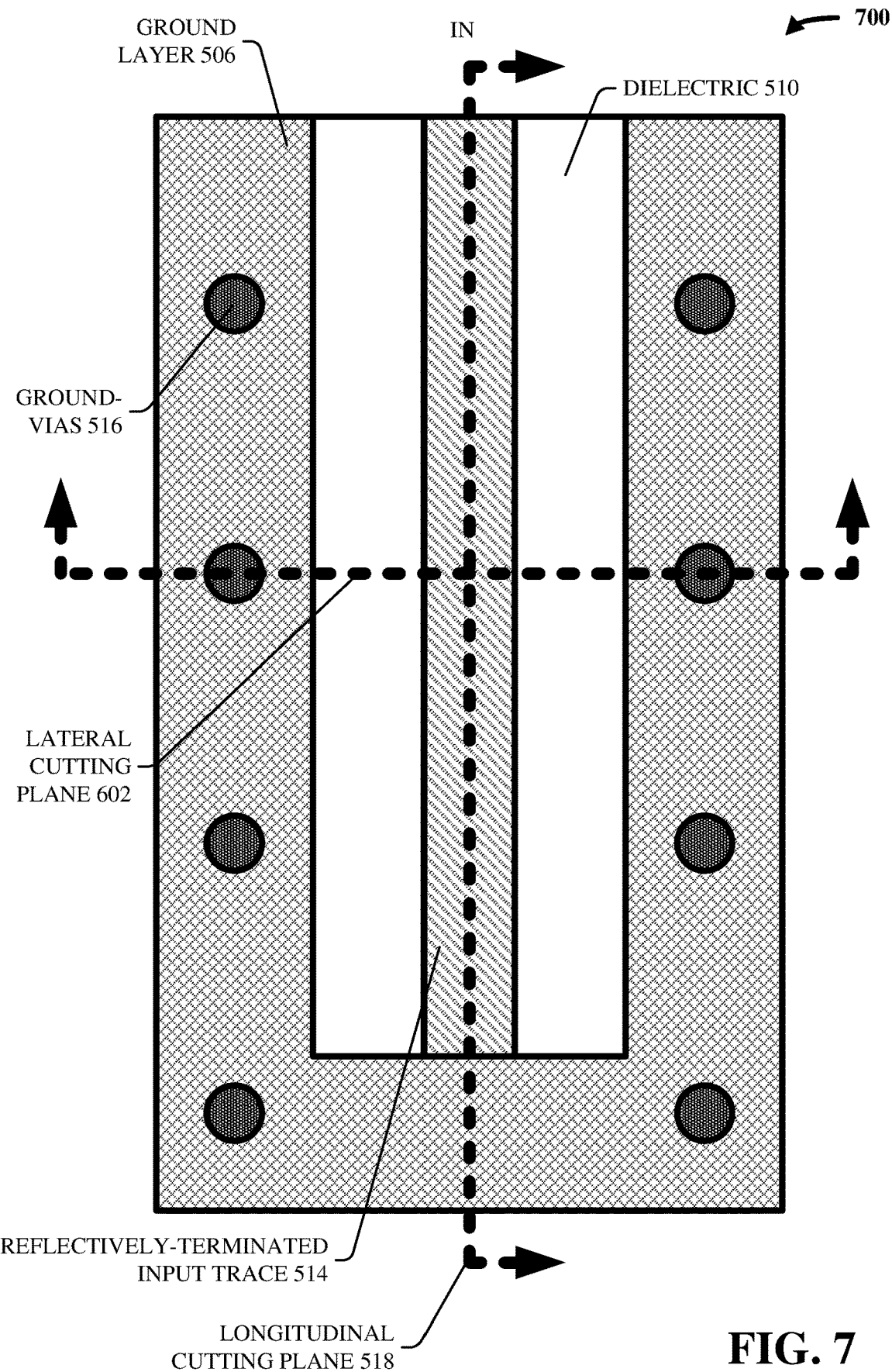

In various aspects, FIG. 7 depicts an aerial longitudinal cross-sectional view 700 of the four-layer stripline architecture that is shown in FIG. 5. More specifically, FIG. 7 illustrates an aerial view of the third layer of the four-layer stripline architecture shown in FIG. 5, which can include the ground layer 506 and the reflectively-terminated input trace 514. Note that the longitudinal direction of the four-layer stripline architecture can extend in an up-down direction from the perspective of FIG. 7 (e.g., just like in FIG. 6), whereas that same longitudinal direction can extend into-the-page and/or out-of-the page from the perspective of FIG. 5.

Figure 9:
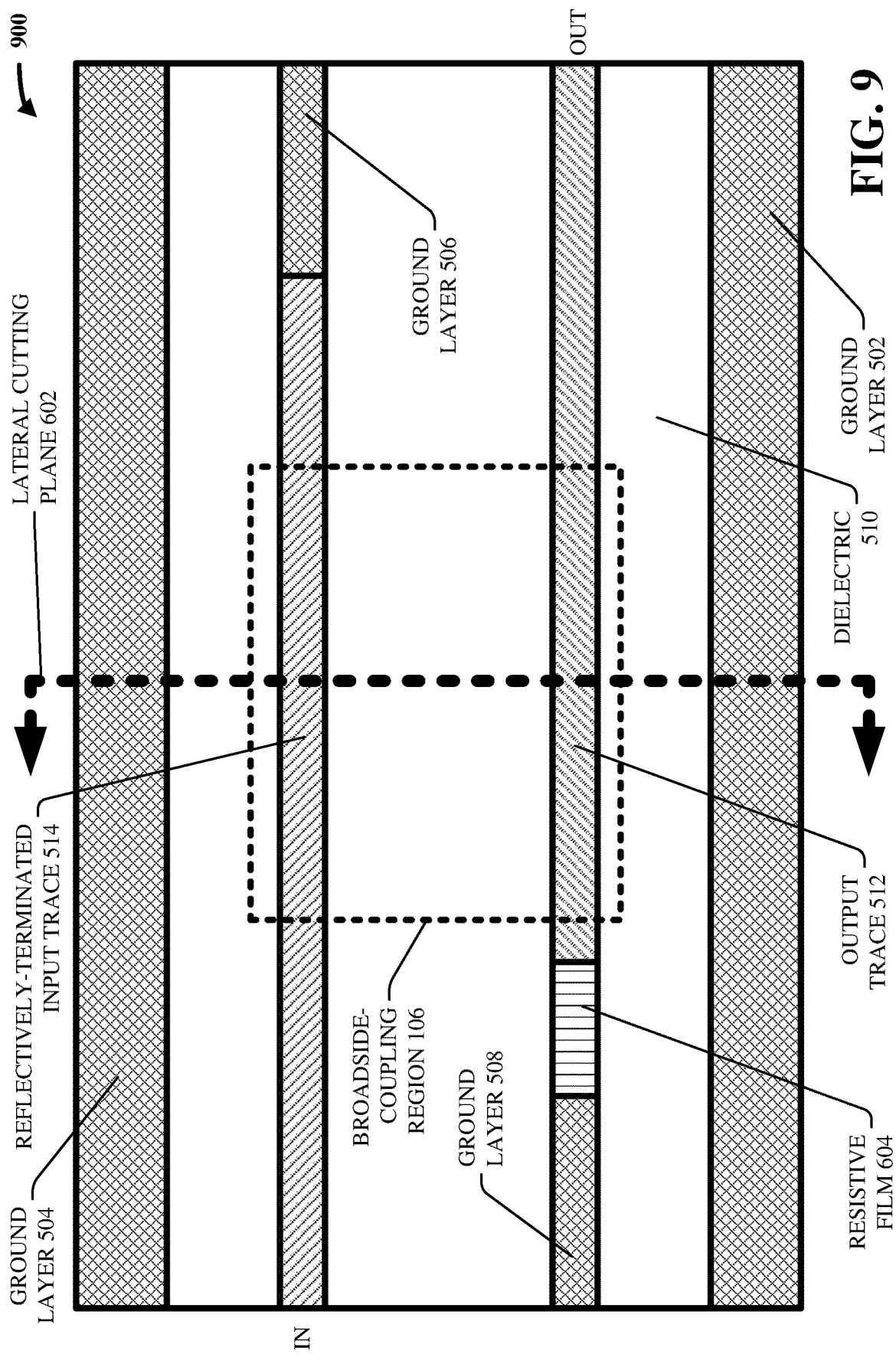
Figure 10:
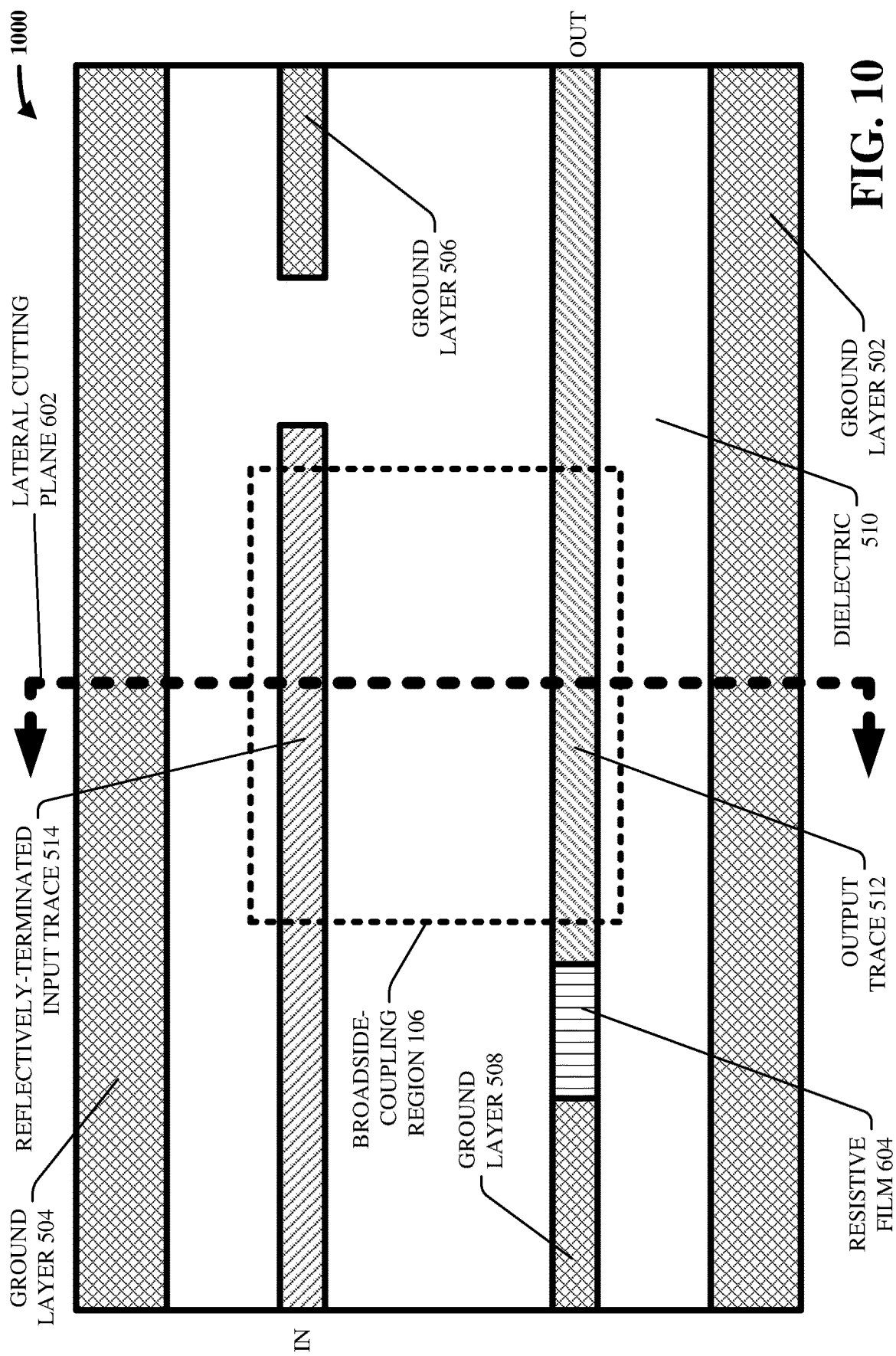

Just like FIG. 6, FIG. 7 marks the location of the lateral cutting plane 602 (e.g., along which and/or according to which FIG. 5 depicts the four-layer stripline architecture) and of the longitudinal cutting plane 518 (e.g., along which and/or according to which FIGS. 9-10 will depict the four-layer stripline architecture). Also, FIG. 7 shows non-limiting embodiments of the ground-vias 516.

Now, as can be seen, FIG. 7 illustrates an aerial view of the longitudinally central cut-out portion of the ground layer 506 through which, along which, and/or between which the reflectively-terminated input trace 514 can longitudinally run. In various aspects, as shown, a first end (e.g., an upstream end) of the reflectively-terminated input trace 514 can be denoted by "IN" in FIG. 7. Note that the "IN" denotation in FIG. 7 can be considered as corresponding to the "IN" denotation of FIGS. 1-4 (e.g., the upstream end of the reflectively-terminated input trace 514 that is marked by "IN" in FIG. 7 can form and/or function as the upstream end of the reflectively-terminated input line 102 that is marked by "IN" in FIGS. 1-4). As can also be seen, a second end (e.g., a downstream end) of the reflectively-terminated input trace 514 can be coupled directly to the ground layer 506. In other words, the second end of the reflectively-terminated input trace 514 can be shorted to the ground layer 506. Therefore, in various aspects, FIG. 7 can be considered as illustrating an example, non-limiting structure of the reflectively-terminated input line 102 that is shown in FIGS. 1-2 (e.g., showing a shorted reflective-termination).

Figure 8:
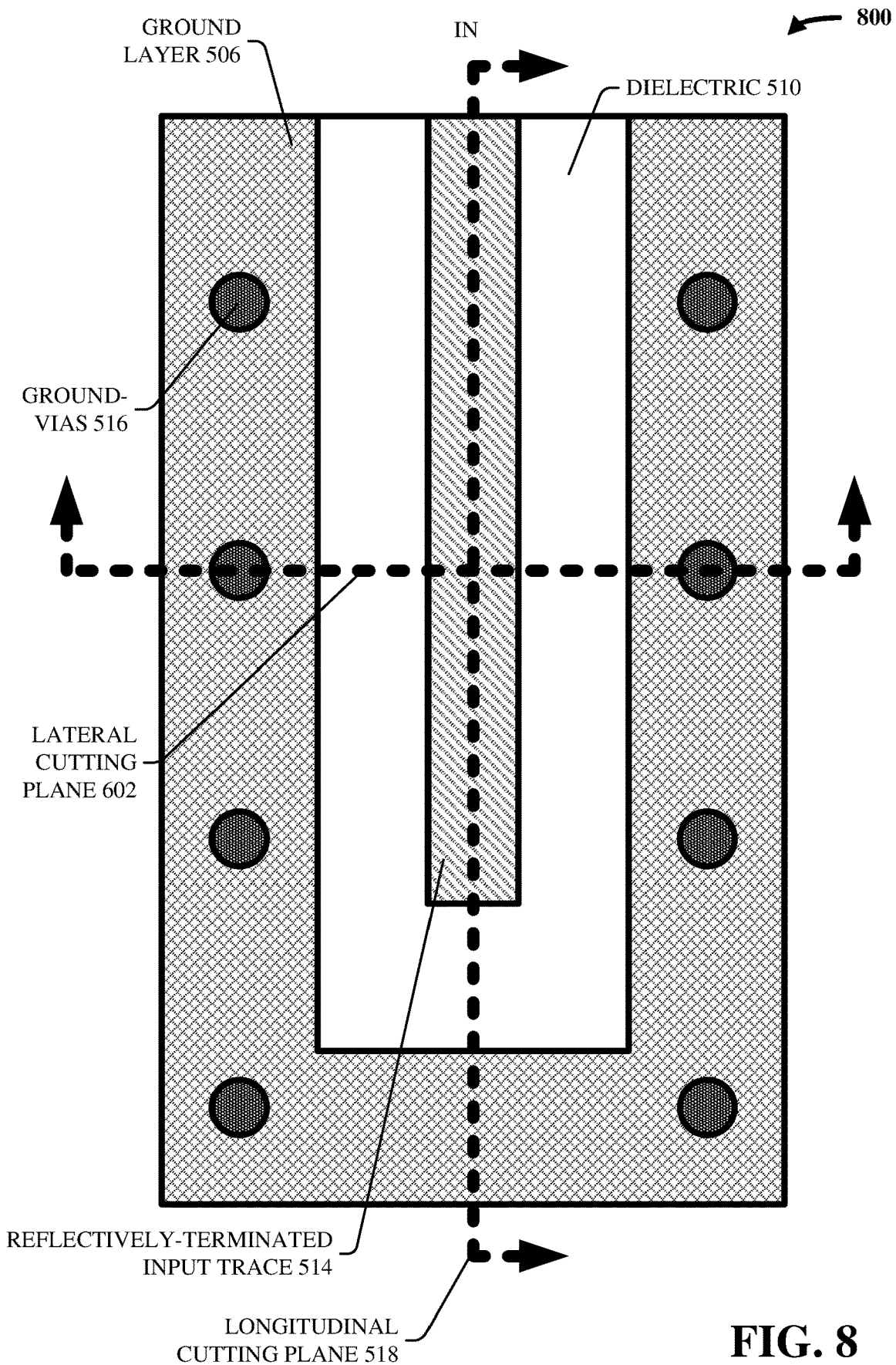

In various aspects, FIG. 8 depicts an alternative aerial longitudinal cross-sectional view 800 of the four-layer stripline architecture that is shown in FIG. 5. More specifically, FIG. 8 illustrates an alternative aerial view of the third layer of the four-layer stripline architecture shown in FIG. 5, which can include the ground layer 506 and the reflectively-terminated input trace 514. Note that the longitudinal direction of the four-layer stripline architecture can extend in an up-down direction from the perspective of FIG. 8 (e.g., just like in FIG. 6), whereas that same longitudinal direction can extend into-the-page and/or out-of-the page from the perspective of FIG. 5.

Just like FIG. 6, FIG. 8 marks the location of the lateral cutting plane 602 (e.g., along which and/or according to which FIG. 5 depicts the four-layer stripline architecture) and of the longitudinal cutting plane 518 (e.g., along which and/or according to which FIGS. 9-10 will depict the four-layer stripline architecture). Also, FIG. 8 shows non-limiting embodiments of the ground-vias 516.

Now, as can be seen, FIG. 8 illustrates an aerial view of the longitudinally central cut-out portion of the ground layer 506 through which, along which, and/or between which the reflectively-terminated input trace 514 can longitudinally run. In various aspects, as shown, a first end (e.g., an upstream end) of the reflectively-terminated input trace 514 can be denoted by "IN" in FIG. 8. Just like with FIG. 7, the "IN" denotation of FIG. 8 can be considered as corresponding to the "IN" denotation of FIGS. 1-4 (e.g., the upstream end of the reflectively-terminated input trace 514 that is marked by "IN" in FIG. 8 can form and/or function as the upstream end of the reflectively-terminated input line 102 that is marked by "IN" in FIGS. 1-4). As can also be seen, a second end (e.g., a downstream end) of the reflectively-terminated input trace 514 can be electrically separated and/or disconnected from the ground layer 506. In other words, the second end of the reflectively-terminated input trace 514 can be left open from the ground layer 506 (e.g., can be separated from the ground layer 506 by the dielectric 510). Therefore, in various aspects, FIG. 8 can be considered as illustrating an example, non-limiting structure of the reflectively-terminated input line 102 that is shown in FIGS. 3-4 (e.g., showing an open reflective-termination).

In various aspects, FIG. 9 depicts a profile longitudinal cross-sectional view 900 of the four-layer stripline architecture that is shown in FIGS. 5, 6, and 7. More specifically, FIG. 9 illustrates a profile view of all four layers of the four-layer stripline architecture shown in FIGS. 5, 6, and 7 (e.g., where a shorted reflective-termination is implemented). Note that the longitudinal direction of the four-layer stripline architecture can extend in a right-left direction from the perspective of FIG. 9, whereas that same longitudinal direction can extend into-the-page and/or out-of-the page from the perspective of FIG. 5, and whereas that same longitudinal direction can extend in an up-down direction from the perspectives of FIGS. 6 and 7. In various aspects, FIG. 9 can be considered as illustrating the four-layer stripline architecture along and/or according to the longitudinal cutting plane 518, which is marked in FIGS. 5, 6, and 7.

As can be seen, the reflectively-terminated input trace 514 and the output trace 512 can be longitudinally sandwiched by the ground layer 504 and the ground layer 502, with interstitial spaces filled by the dielectric 510. As can also be seen, the first end (e.g., the upstream end) of the output trace 512 can be coupled to the ground layer 508 by the resistive film 604, and the second end (e.g., the downstream end) of the output trace 512 can be marked by the "OUT" denotation. As can further be seen, the first end (e.g., the upstream end) of the reflectively-terminated input trace 514 can be marked by the "IN" denotation, and the second end (e.g., the downstream end) of the reflectively-terminated input trace 514 can be shorted to the ground layer 506. As can yet further be seen, some portion of the reflectively-terminated input trace 514 and some portion of the output trace 512 can longitudinally run in spatial proximity to each other, which can give rise to near-end crosstalk and thus broadside-coupling. For viewing convenience, the broadside-coupling region 106 of FIGS. 1-4 is marked in FIG. 9, to show where near-end crosstalk can occur between the output trace 512 and the reflectively-terminated input trace 514. As additionally seen, FIG. 9 marks the location of the lateral cutting plane 602, which is also marked in FIGS. 6-7 and according to which and/or along which FIG. 5 depicts the four-layer stripline architecture.

In various aspects, FIG. 10 depicts a profile longitudinal cross-sectional view 1000 of the four-layer stripline architecture that is shown in FIGS. 5, 6, and 8. More specifically, FIG. 10 illustrates a profile view of all four layers of the four-layer stripline architecture shown in FIGS. 5, 6, and 8 (e.g., where an open reflective-termination is implemented). Note that the longitudinal direction of the four-layer stripline architecture can extend in a right-left direction from the perspective of FIG. 10, whereas that same longitudinal direction can extend into-the-page and/or out-of-the page from the perspective of FIG. 5, and whereas that same longitudinal direction can extend in an up-down direction from the perspectives of FIGS. 6 and 8. In various aspects, FIG. 10 can be considered as illustrating the four-layer stripline architecture along and/or according to the longitudinal cutting plane 518, which is marked in FIGS. 5, 6, and 8.

As can be seen, the reflectively-terminated input trace 514 and the output trace 512 can be longitudinally sandwiched by the ground layer 504 and the ground layer 502, with interstitial spaces filled by the dielectric 510. As can also be seen, the first end (e.g., the upstream end) of the output trace 512 can be coupled to the ground layer 508 by the resistive film 604, and the second end (e.g., the downstream end) of the output trace 512 can be marked by the "OUT" denotation. As can further be seen, the first end (e.g., the upstream end) of the reflectively-terminated input trace 514 can be marked by the "IN" denotation, and the second end (e.g., the downstream end) of the reflectively-terminated input trace 514 can be left open from the ground layer 506 (e.g., can be separated from the ground layer 506 by the dielectric 510). Just like in FIG. 9, the broadside-coupling region 106 of FIGS. 1-4 is marked in FIG. 10, to show where near-end crosstalk can occur between the output trace 512 and the reflectively-terminated input trace 514. As additionally seen, FIG. 10 marks the location of the lateral cutting plane 602, which is also marked in FIGS. 6 and 8 and according to which and/or along which FIG. 5 depicts the four-layer stripline architecture.

Those having ordinary skill in the art will appreciate that FIGS. 5-10 show non-limiting examples of how a high-density broadside-coupled attenuator can be physically structured. Those having ordinary skill in the art will further appreciate that any structures shown in FIGS. 5-10 can be manufactured by any suitable fabrication techniques (e.g., photolithography, deposition, etching).

Although FIGS. 5-10 show the reflectively-terminated input trace 514 as being positioned above and/or over top of the output trace 512, this is a mere non-limiting example for ease of illustration. In various cases, the output trace 512 can be positioned above and/or over top of the reflectively-terminated input trace 514.

Although FIGS. 5-10 show the reflectively-terminated input trace 514 and the output trace 512 as being vertically aligned with each other, this is a mere non-limiting example for ease of illustration. In various cases, the reflectively-terminated input trace 514 and the output trace 512 can be horizontally offset from each other by any suitable distance, such that the reflectively-terminated input trace 514 and the output trace 512 are not vertically aligned with each other.

Those having ordinary skill in the art will appreciate that the non-limiting four-layer stripline architectures shown in FIGS. 5-10 can be embedded into any suitable driveline cable (e.g., the driveline cable can be a coaxial cable, or the driveline cable can be a flex cable).

Although the herein disclosure mainly describes various embodiments of a high-density embedded broadside-coupled attenuator as exhibiting a stripline architecture (e.g., a four-layer stripline architecture as shown in FIGS. 5-10), this is a mere non-limiting example for ease of illustration. In various aspects, a high-density broadside-coupled attenuator can exhibit any suitable wire structures (e.g., can be not limited only to striplines). For example, a high-density broadside-coupled attenuator can be formed when an output wire is broadside-coupled to a reflectively-terminated input wire, even when the output wire is not a stripline and/or even when the reflectively-terminated input wire is not a stripline.

Thus far, the herein disclosure has mainly described electrical characteristics of high-density broadside-coupled attenuators (e.g., with respect to FIGS. 1-4) and how such high-density broadside-coupled attenuators can be physically structured (e.g., with respect to FIGS. 5-10). In various cases, the remaining figures can help to explain how such high-density broadside-coupled attenuators can be leveraged and/or used.

FIGS. 11-15 illustrate circuit diagrams 1100, 1200, 1300, 1400, and 1500 of two example, non-limiting high-density embedded broadside-coupled attenuators that are daisy-chained together in accordance with one or more embodiments described herein. In other words, FIGS. 11-15 show how two or more high-density broadside-coupled attenuators can be connected in series with each other.

Figure 11:
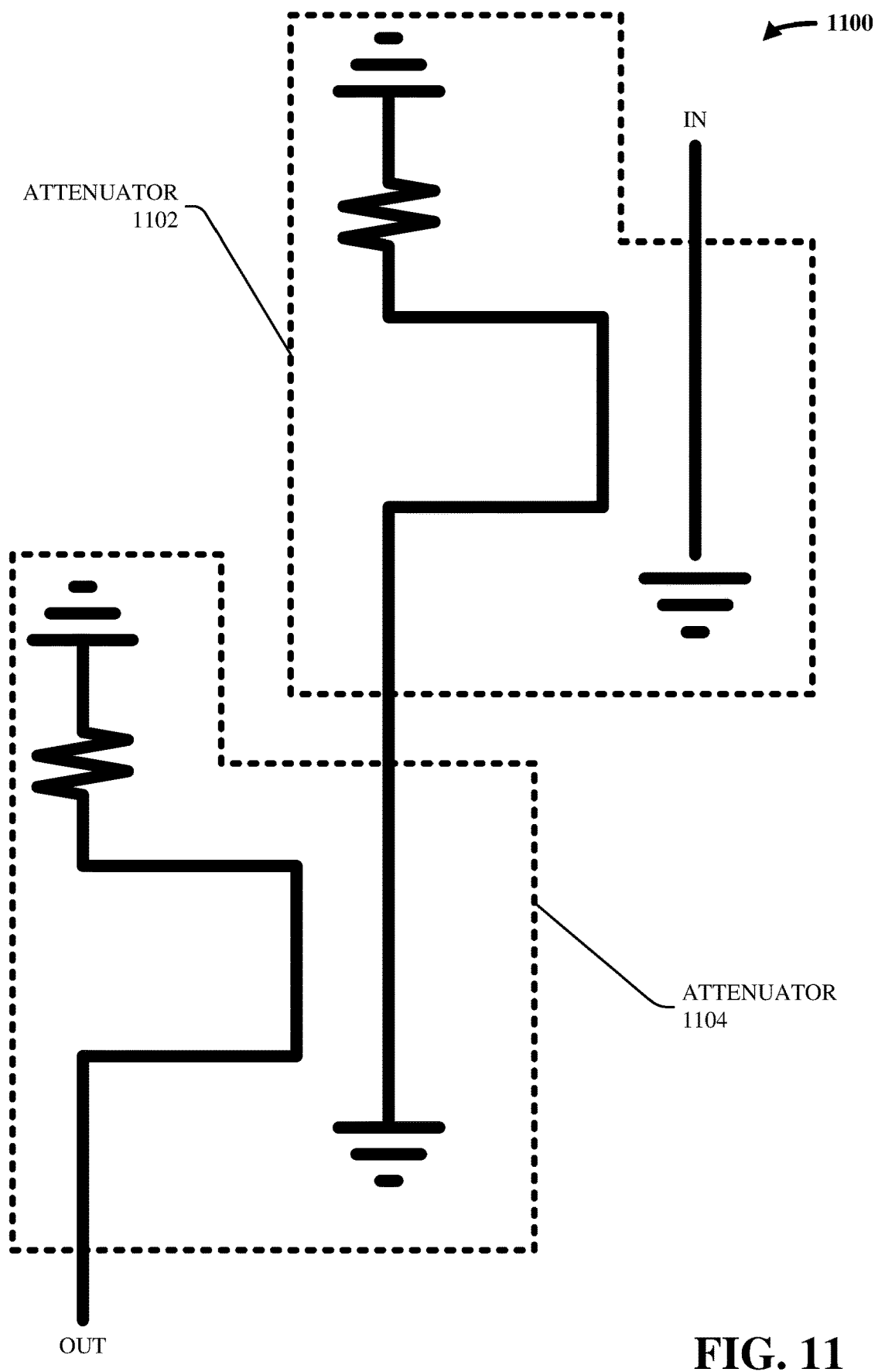
FIGS. 11-15 illustrate circuit diagrams of two example, non-limiting high-density embedded broadside-coupled attenuators that are daisy-chained together in accordance with one or more embodiments described herein.

As shown in FIG. 11, there can be two high-density broadside-coupled attenuators: an attenuator 1102 and/or an attenuator 1104. In various cases, as shown, the attenuator 1102 can have a shorted reflective-termination (e.g., such as that shown in FIGS. 1-2). Likewise, the attenuator 1104 can also have a shorted reflective-termination. However, this is a mere non-limiting example for ease of explanation. In various aspects, the attenuator 1102 and/or the attenuator 1104 can have open reflective-terminations (e.g., such as that shown in FIGS. 3-4). Indeed, in some instances, one of the attenuator 1102 and the attenuator 1104 can have an open reflective-termination and the other of the attenuator 1102 and the attenuator 1104 can have a shorted reflective-termination.

In any case, as shown, daisy-chaining can be accomplished by coupling a downstream end of an output line of the attenuator 1102 to an upstream end of a reflectively-terminated input line of the attenuator 1104. FIGS. 12-15 illustrate how such a daisy-chained architecture can operate and/or function.

Figure 12:
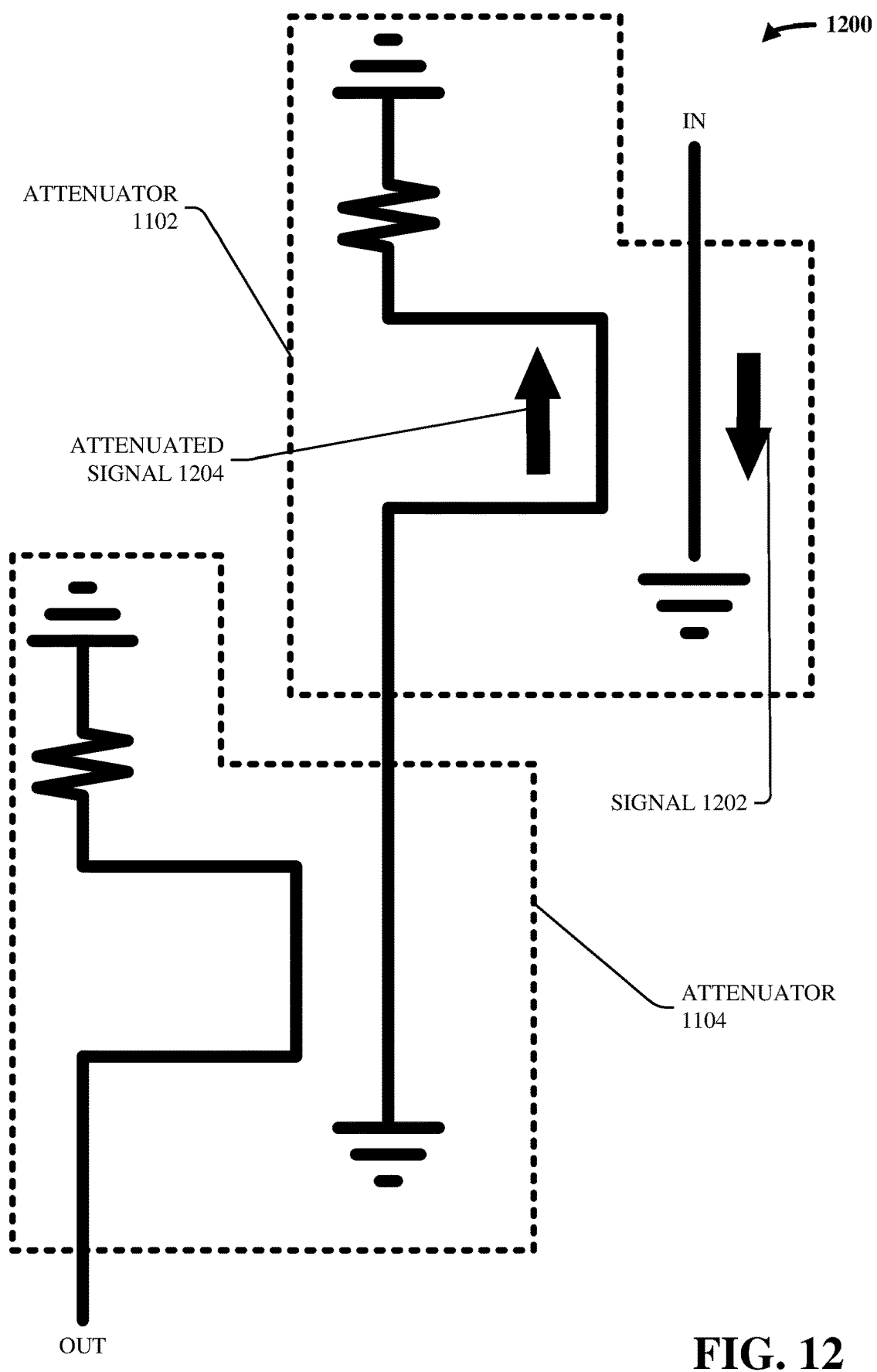

As shown in FIG. 12, a signal 1202 can be received by the upstream end of the reflectively-terminated input line of the attenuator 1102. In various aspects, the signal 1202 can be any suitable microwave tone and/or pulse having any suitable frequency, amplitude, and/or duration. As shown, near-end crosstalk in the attenuator 1102 can cause an attenuated signal 1204 to begin propagating along the output line of the attenuator 1102, where the attenuated signal 1204 can be any suitable microwave tone/pulse having the same/similar frequency and/or duration as the signal 1202, where the attenuated signal 1204 can have a reduced amplitude and/or reduced noise as compared to the signal 1202, and/or where the direction of propagation of the attenuated signal 1204 can be opposite to that of the signal 1202. Thus, since the signal 1202 can propagate along the reflectively-terminated input line of the attenuator 1102 in a downstream direction, the attenuated signal 1204 can propagate along the output line of the attenuator 1102 in an upstream direction. Eventually, the attenuated signal 1204 can be dissipated by a resistive load the couples the upstream end of the output line of the attenuator 1102 to ground. Moreover, the signal 1202 can eventually reach the reflective-termination of the attenuator 1102, which can cause the signal 1202 to be reflected backward, as shown in FIG. 13.

Figure 13:
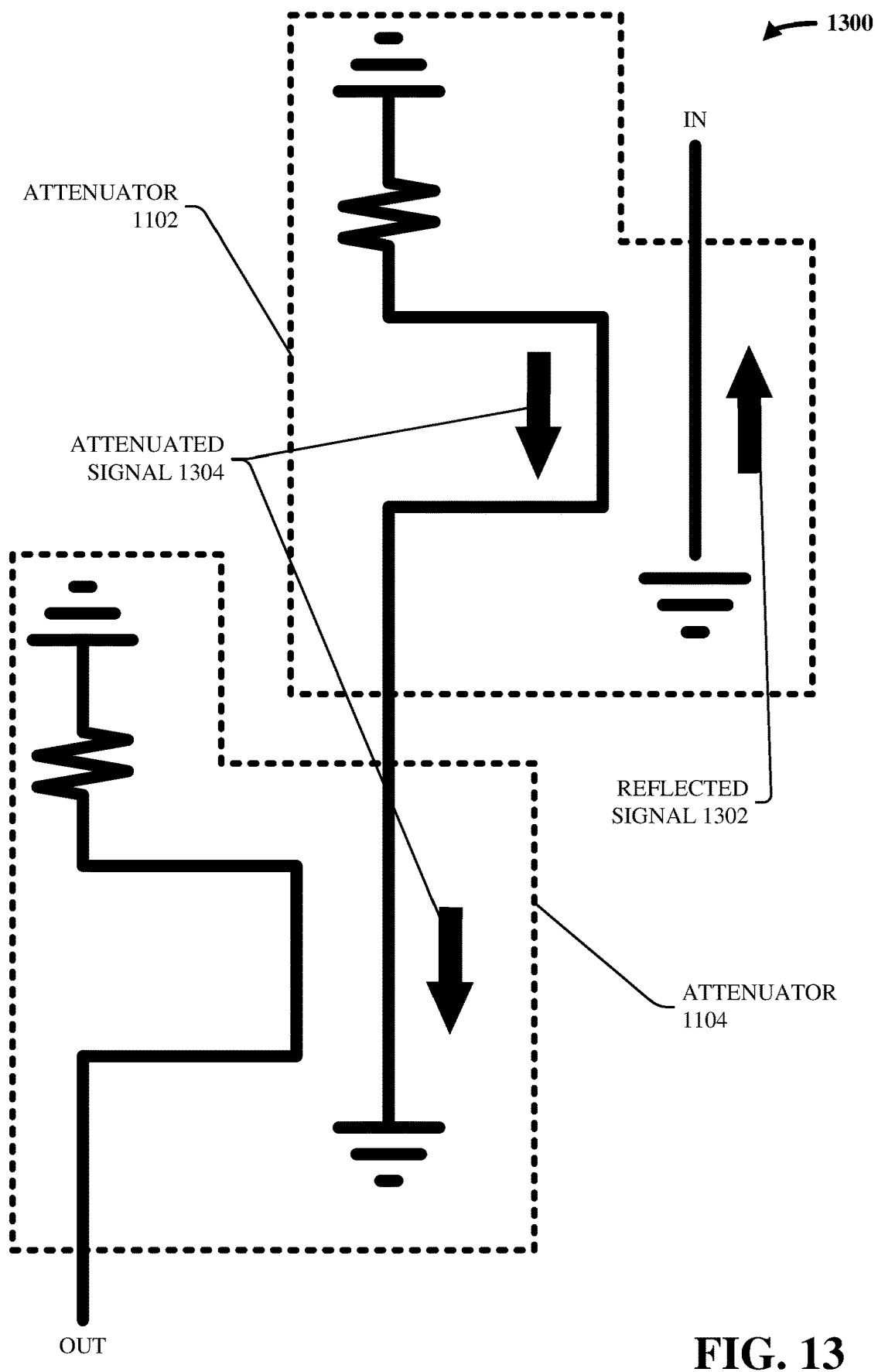

As can be seen in FIG. 13, a reflected signal 1302 can be considered as the result of the signal 1202 encountering the reflective-termination of the attenuator 1102. Thus, the reflected signal 1302 can be any suitable microwave tone/pulse that has the same/similar frequency, amplitude, and/or duration as the signal 1202, but that has an opposite direction of propagation as the signal 1202. Accordingly, the reflected signal 1302 can propagate along the reflectively-terminated input line of the attenuator 1102 in an upstream direction. As shown, near-end crosstalk in the attenuator 1102 can occur again, which can cause an attenuated signal 1304 to begin propagating along the output line of the attenuator 1102, where the attenuated signal 1304 can be any suitable microwave tone/pulse having the same/similar frequency and/or duration as the reflected signal 1302, where the attenuated signal 1304 can have a reduced amplitude and/or reduced noise as compared to the reflected signal 1302, and/or where the direction of propagation of the attenuated signal 1304 can be opposite to that of the reflected signal 1302. Thus, since the reflected signal 1302 can propagate along the reflectively-terminated input line of the attenuator 1102 in an upstream direction, the attenuated signal 1304 can propagate along the output line of the attenuator 1102 in a downstream direction. Eventually, the attenuated signal 1304 can be received by the upstream end of the reflectively-terminated input line of the attenuator 1104.

Figure 14:
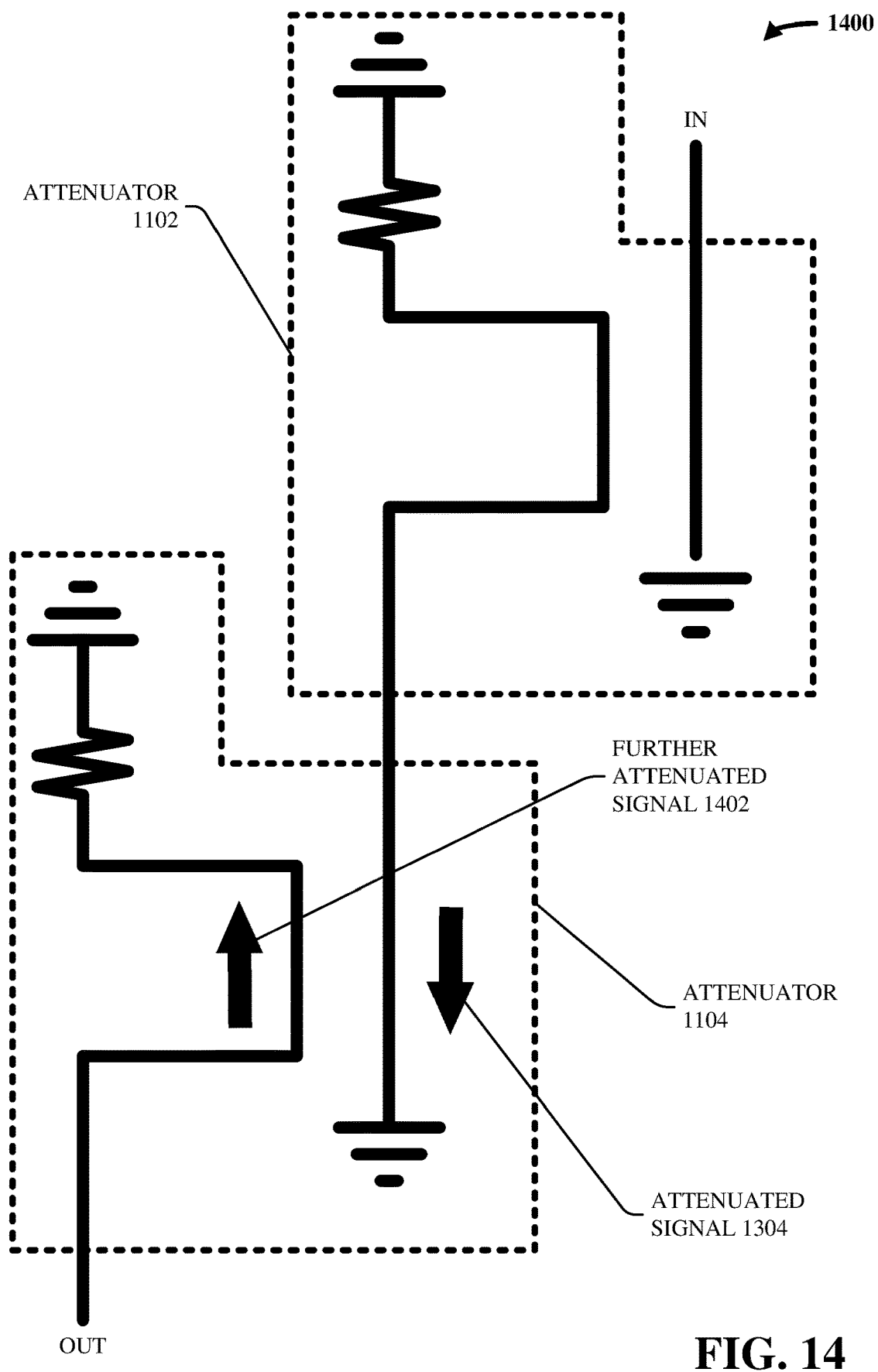

As shown in FIG. 14, near-end crosstalk in the attenuator 1104 can cause a further attenuated signal 1402 to begin propagating along the output line of the attenuator 1104, where the further attenuated signal 1402 can be any suitable microwave tone/pulse having the same/similar frequency and/or duration as the attenuated signal 1304, where the further attenuated signal 1402 can have a reduced amplitude and/or reduced noise as compared to the attenuated signal 1304, and/or where the direction of propagation of the further attenuated signal 1402 can be opposite to that of the attenuated signal 1304. Thus, since the attenuated signal 1304 can propagate along the reflectively-terminated input line of the attenuator 1104 in a downstream direction, the further attenuated signal 1402 can propagate along the output line of the attenuator 1104 in an upstream direction. Eventually, the further attenuated signal 1402 can be dissipated by a resistive load the couples the upstream end of the output line of the attenuator 1104 to ground. Moreover, the attenuated signal 1304 can eventually reach the reflective-termination of the attenuator 1104, which can cause the attenuated signal 1304 to be reflected backward, as shown in FIG. 15.

Figure 15:
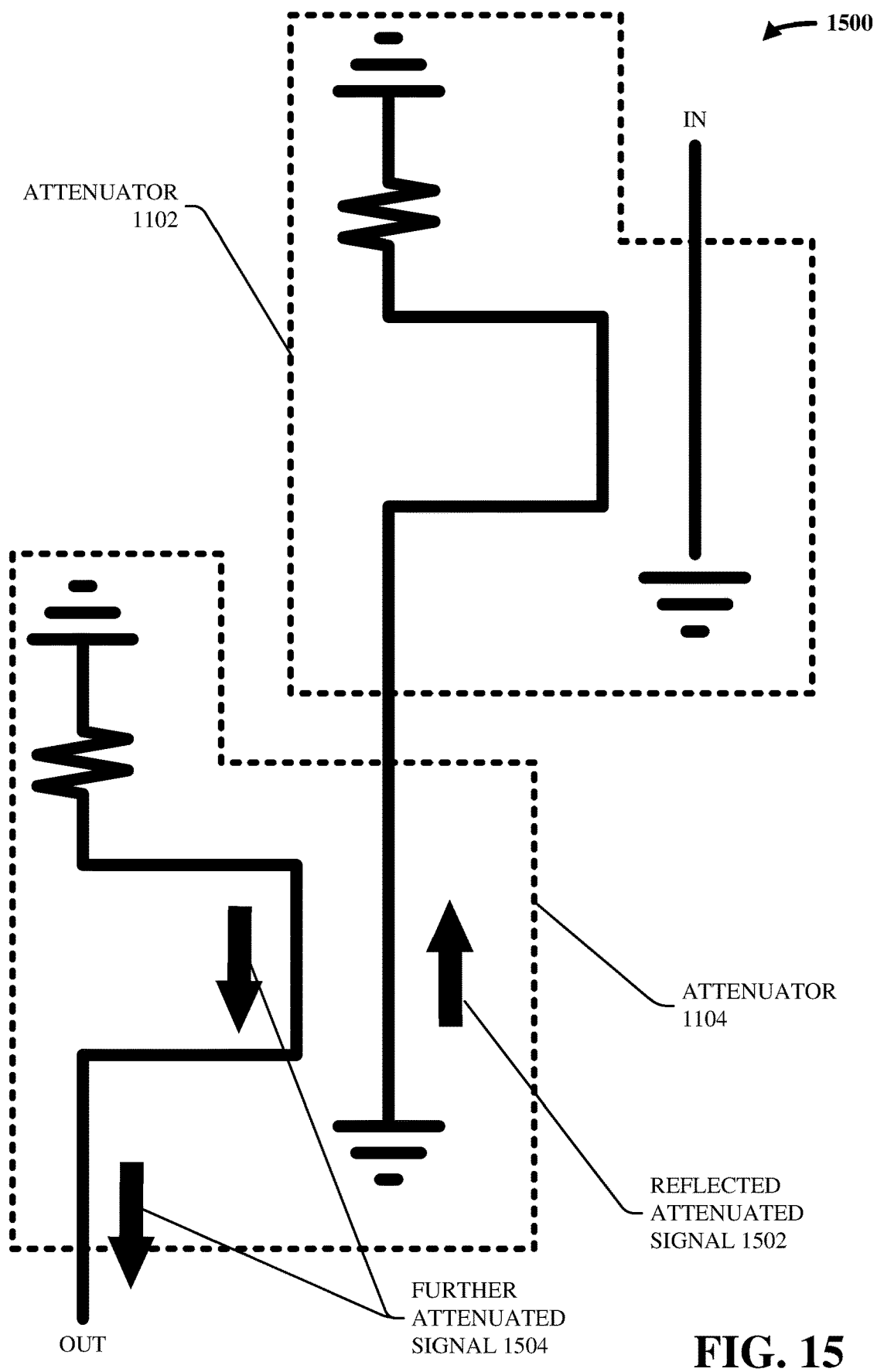

As can be seen in FIG. 15, a reflected attenuated signal 1502 can be considered as the result of the attenuated signal 1304 encountering the reflective-termination of the attenuator 1104. Thus, the reflected attenuated signal 1502 can be any suitable microwave tone/pulse that has the same/similar frequency, amplitude, and/or duration as the attenuated signal 1304, but that has an opposite direction of propagation as the attenuated signal 1304. Accordingly, the reflected attenuated signal 1502 can propagate along the reflectively-terminated input line of the attenuator 1104 in an upstream direction. As shown, near-end crosstalk in the attenuator 1104 can occur again, which can cause a further attenuated signal 1504 to begin propagating along the output line of the attenuator 1104, where the further attenuated signal 1504 can be any suitable microwave tone/pulse having the same/similar frequency and/or duration as the reflected attenuated signal 1502, where the further attenuated signal 1504 can have a reduced amplitude and/or reduced noise as compared to the reflected attenuated signal 1502, and/or where the direction of propagation of the further attenuated signal 1504 can be opposite to that of the reflected attenuated signal 1502. Thus, since the reflected attenuated signal 1502 can propagate along the reflectively-terminated input line of the attenuator 1104 in an upstream direction, the further attenuated signal 1504 can propagate along the output line of the attenuator 1104 in a downstream direction. Eventually, the reflected attenuated signal 1502 can encounter the resistive load that couples the upstream end of the output line of the attenuator 1102 to ground, which can dissipate the reflected attenuated signal 1502.

In this way, two or more high-density broadside-coupled attenuators can be daisy-chained together. Furthermore, although not explicitly shown in FIGS. 11-15, any other suitable circuit elements can be implemented in-line with the attenuator 1102 and/or with the attenuator 1104 (e.g., one or more circuit filters can be positioned upstream from the attenuator 1102, downstream from the attenuator 1104, and/or between the attenuator 1102 and the attenuator 1104).

Figure 16:
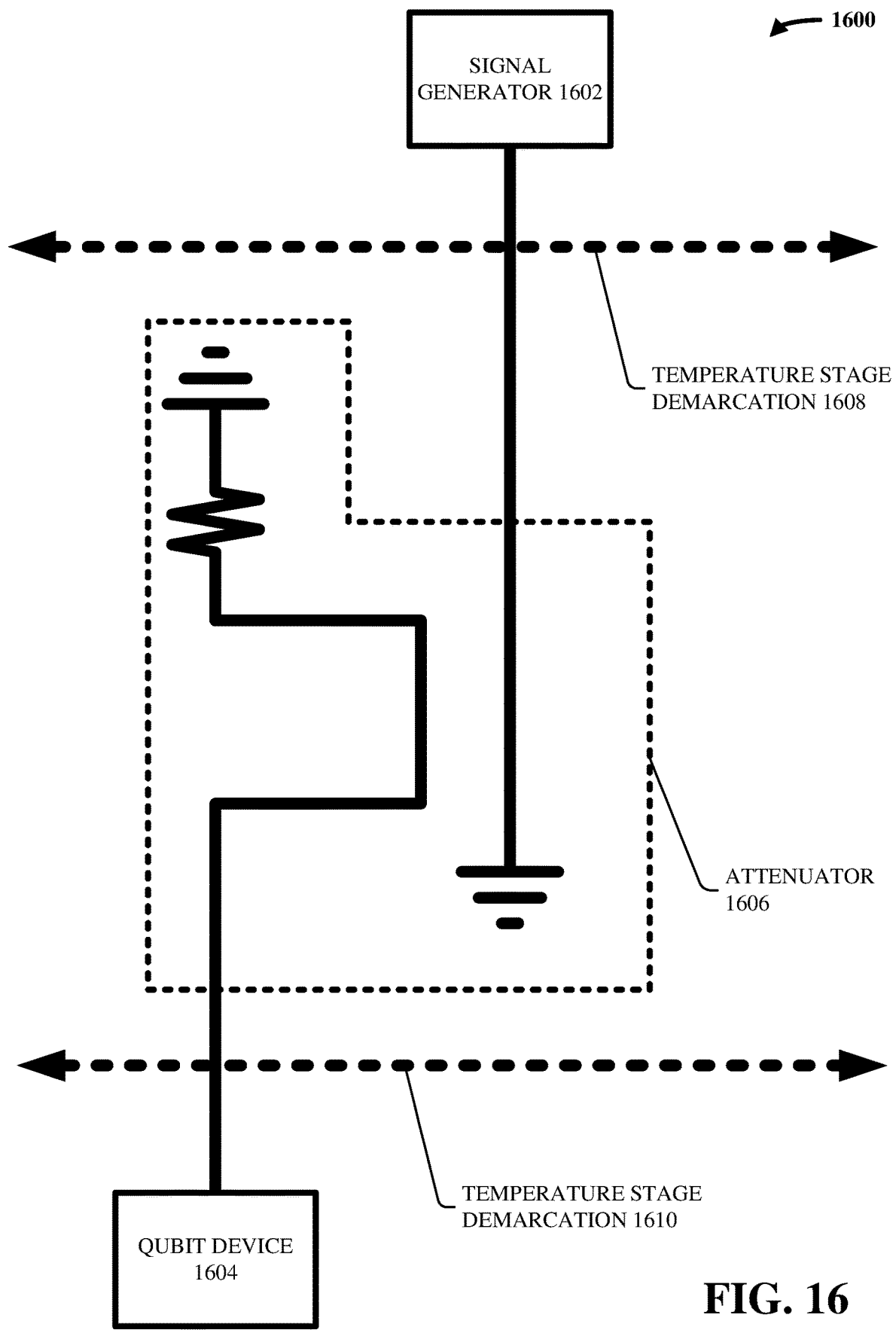
FIG. 16 illustrates a circuit diagram of an example, non-limiting high-density embedded broadside-coupled attenuator that couples a signal generator to a qubit device in accordance with one or more embodiments described herein.

FIG. 16 illustrates a circuit diagram 1600 of an example, non-limiting high-density embedded broadside-coupled attenuator that can couple a signal generator to a qubit device in accordance with one or more embodiments described herein.

In various embodiments, there can be a signal generator 1602 and/or a qubit device 1604. In various aspects, the signal generator 1602 can be any suitable waveform generator (e.g., can be a voltage and/or current sourced oscillator). In various instances, the qubit device 1604 can include any suitable number of any suitable type of qubits (e.g., superconducting qubits, spin qubits). In any case, it can be desired for the qubit device 1604 to be driven by the signal generator 1602 (e.g., it can be desired for the qubit device 1604 to be exposed to a drive tone produced by the signal generator 1602). In various cases, one or more high-density broadside-coupled attenuators can be implemented to facilitate such driving.

For instance, as shown, an attenuator 1606 can couple the signal generator 1602 to the qubit device 1604. In various aspects, as can be seen, the attenuator 1606 can exhibit a high-density broadside-coupled structure that utilizes a shorted reflective-termination (e.g., such as that shown in FIGS. 1-2). However, this is a mere non-limiting example. In various instances, the attenuator 1606 can instead have an open reflective-termination (e.g., such as that shown in FIGS. 3-4). In any case, an upstream end of a reflectively-terminated input line of the attenuator 1606 can be coupled to the signal generator 1602, and a downstream end of an output line of the attenuator 1606 can be coupled to the qubit device 1604. Thus, when a drive tone is created by the signal generator 1602, it can be attenuated by the attenuator 1606 before reaching the qubit device 1604.

In various aspects, the signal generator 1602, the attenuator 1606, and/or the qubit device 1604 can be implemented and/or physically located within any suitable number of temperature stages and/or temperature chambers. Such temperature stages/chambers can be denoted in FIG. 16 by a temperature stage demarcation 1608 and/or by a temperature stage demarcation 1610. For example, in some cases, the signal generator 1602 can be implemented in a non-cryogenic temperature stage/chamber (e.g., can be implemented at and/or near room temperature), the qubit device 1604 can be implemented in a cryogenic temperature stage/chamber, and the attenuator 1606 can be implemented in an intermediate temperature stage/chamber. Accordingly, the temperature stage demarcation 1608 can be considered as marking a point of separation between the non-cryogenic temperature stage/chamber and the intermediate temperature stage/chamber, and the temperature stage demarcation 1610 can be considered as marking a point of separation between the intermediate temperature stage/chamber and the cryogenic temperature stage/chamber.

However, this is merely a non-limiting example. In some cases, the signal generator 1602 and the attenuator 1606 can be implemented in the same temperature stage/chamber as each other (e.g., both in the non-cryogenic temperature stage/chamber, or both in the intermediate temperature stage/chamber). In other cases, the attenuator 1606 and the qubit device 1604 can be implemented in the same temperature stage/chamber as each other (e.g., both in the cryogenic temperature stage/chamber). In still other cases, all three of the signal generator 1602, the attenuator 1606, and the qubit device 1604 can be implemented in the same temperature stage/chamber as each other (e.g., all in the cryogenic temperature stage/chamber).

Although not explicitly shown in FIG. 16, those having ordinary skill in the art will appreciate that any suitable number of intermediate temperature stages/chambers can be implemented between the signal generator 1602 and the qubit device 1604.

Although not explicitly shown in FIG. 16, those having ordinary skill in the art will appreciate that more than one attenuator can be implemented to couple the signal generator 1602 to the qubit device 1604 (e.g., two or more attenuators can be daisy-chained together between the signal generator 1602 and the qubit device 1604). Moreover, although not explicitly shown in FIG. 16, those having ordinary skill in the art will appreciate that any other suitable circuit structures can be implemented between the signal generator 1602 and the qubit device 1604 (e.g., any suitable number of circuit filters can be implemented in-line with the attenuator 1606 and/or in-line among two or more daisy-chained attenuators).

Figure 17:
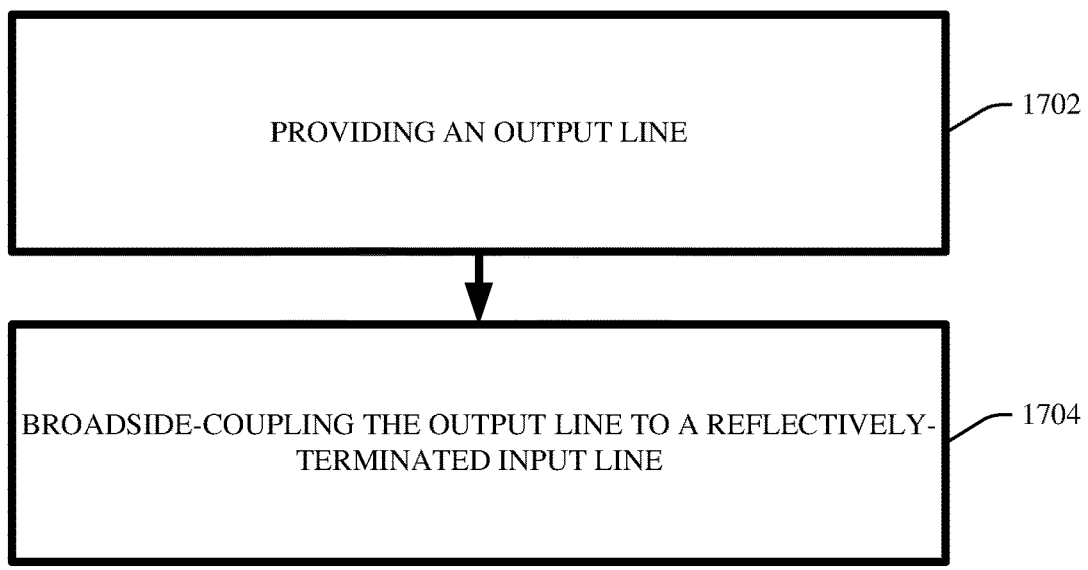
FIGS. 17-18 illustrate flow diagrams of example, non-limiting methods for facilitating high-density embedded broadside-coupled attenuators in accordance with one or more embodiments described herein.
Figure 18:
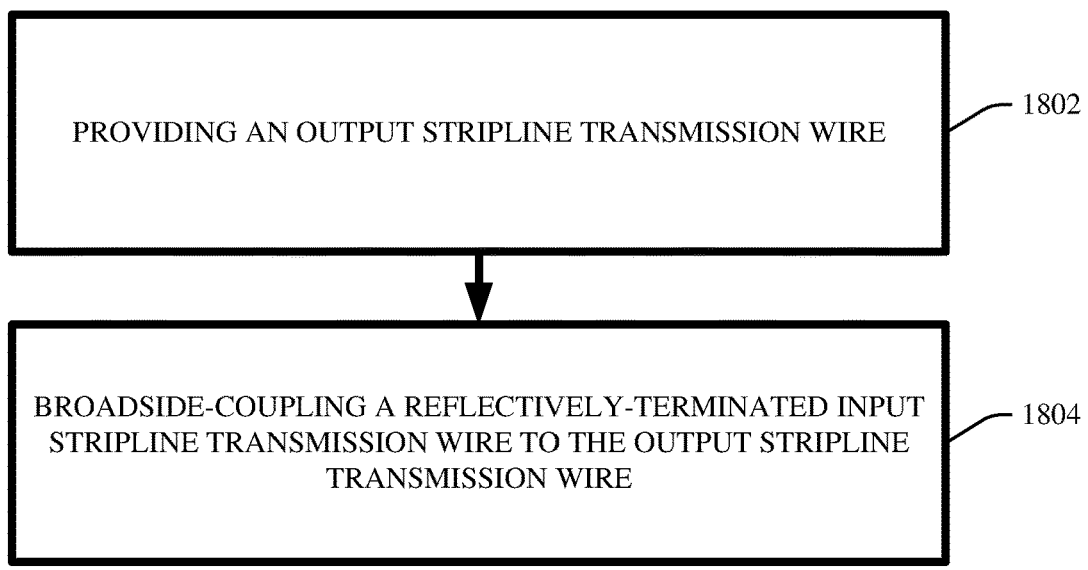

FIGS. 17-18 illustrate flow diagrams of example, non-limiting methods 1700 and 1800 for facilitating high-density embedded broadside-coupled attenuators in accordance with one or more embodiments described herein.

In various embodiments, act 1702 can include providing an output line (e.g., 104). In various aspects, act 1704 can include broadside-coupling the output line to a reflectively-terminated input line (e.g., 102). Although not explicitly shown in FIG. 17, a downstream end of the reflectively-terminated input line can, in some cases, be shorted to ground (e.g., as shown in FIGS. 1-2) and can, in other cases, be open from ground (e.g., as shown in FIGS. 3-4). Although not explicitly shown in FIG. 17, the output line can exhibit a non-looped back layout (e.g., as shown in FIGS. 1-4). Although not explicitly shown in FIG. 17, an upstream end of the output line can be terminated to ground by at least one resistive load (e.g., 110), and/or a downstream end of the output line can be coupled to a device (e.g., 1604).

In various embodiments, act 1802 can include providing an output stripline transmission wire (e.g., collectively 512, 502, 504, and 508). In various aspects, act 1804 can include broadside-coupling a reflectively-terminated input stripline transmission wire (e.g., collectively 514, 502, 504, and 506) to the output stripline transmission wire. Although not explicitly shown in FIG. 18, the reflectively-terminated input stripline transmission wire can comprise a trace (e.g., 514) between a ground (e.g., collectively 502, 504, and/or 506), and a downstream end of the trace can be shorted to the ground (e.g., as shown in FIGS. 7 and 9). Although not explicitly shown in FIG. 18, the reflectively-terminated input stripline transmission wire can comprise a trace (e.g., 514) between a ground (e.g., collectively 502, 504, and/or 506), and a downstream end of the trace can be electrically disconnected from the ground (e.g., as shown in FIGS. 8 and 10). Although not explicitly shown in FIG. 18, the output stripline transmission wire can comprise a trace (e.g., 512) between a ground (e.g., collectively 502, 504, and/or 508), and an upstream end of the trace can be coupled to the ground by a resistive film (e.g., 604). Although not explicitly shown in FIG. 18, the output stripline transmission wire can exhibit a non-looped-back layout.

In various embodiments, another methodology associated with various aspects described herein can include: providing a qubit (e.g., 1604); providing an output line (e.g., output line of the attenuator 1606) that can be coupled to the qubit; and/or providing a reflectively terminated input line (e.g., reflectively-terminated input line of the attenuator 1606) that can be broadside-coupled to the output line and/or that can be coupled to a signal generator (e.g., 1602). In various aspects, the qubit can be located within a cryogenic temperature chamber (e.g., marked by 1610), the signal generator can be located within a non-cryogenic temperature chamber (e.g., marked by 1608), and/or broadside-coupling between the output line and the reflectively-terminated input line can occur in the cryogenic temperature chamber, in the non-cryogenic temperature chamber, and/or between the cryogenic temperature chamber and the non-cryogenic temperature chamber (e.g., as explained with respect to FIG. 16).

Therefore, various embodiments described herein include novel architectures for a high-density broadside-coupled attenuator which can consume less physical space than a low-density broadside-coupled attenuator. In other words, the teachings described herein can eliminate the need for looping-back the output line of a broadside-coupled attenuator, which can reduce the physical size of the broadside-coupled attenuator and/or which can reduce pitch degradation caused by the broadside-coupled attenuator.

Although the herein disclosure mainly describes various embodiments of high-density broadside-coupled attenuators coupling signal generators to qubits and/or qubit devices, this is a mere non-limiting example. In various cases, a high-density broadside-coupled attenuator can couple any suitable computing device to a signal generator.

Although the herein disclosure mainly describes various embodiments of high-density broadside-coupled attenuators as including shorted reflective-terminations or open reflective-terminations, these are mere non-limiting examples. In various aspects, a high-density broadside-coupled attenuator can include any suitable reflective-termination (e.g., can be not limited only to shorts and/or circuit breaks).

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments of the subject innovation, and it should be further understood that, in various other embodiments of the subject innovation, it can be the case that such description applies to fewer than "each" of that particular object and/or component.

The flowcharts and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A cable, comprising:
an output line within the cable, wherein an end of the output line nearest to a first end of the cable is terminated to ground by at least one resistive load; and
a reflectively-terminated input line within the cable that is broadside-coupled to the output line, wherein an end of the reflectively-terminated input line nearest to a second end of the cable is shorted to ground, and wherein the second end is different from the first end.

2. The apparatus of claim 1, wherein the output line exhibits a non-looped-back layout.

3. The apparatus of claim 1, wherein the cable is a flexible cable.

4. The apparatus of claim 1, wherein the reflectively-terminated input line is in a layer of a stack of layers of the cable.

5. The apparatus of claim 4, wherein another end of the output line nearest to the second end of the cable is coupled to a device.

6. The apparatus of claim 4, wherein the output line is in another layer of the stack of layers that is adjacent to the layer comprising the reflectively-terminated input line.

7. The apparatus of claim 6, wherein the layer and the other layer are between two ground plane layers of the stack of layers.

8. An attenuator, comprising:
an output stripline transmission wire, wherein an end of the output stripline transmission wire nearest to a first end of the attenuator is terminated to ground by at least one resistive load; and a reflectively-terminated input stripline transmission wire that is broadside-coupled to the output stripline transmission wire, wherein an end of the reflectively-terminated input stripline transmission wire nearest to a second end of the attenuator is shorted to ground, and wherein the second end is opposite from the first end.

9. The attenuator of claim 8, wherein the output stripline transmission wire exhibits a non-looped-back layout.

10. The attenuator of claim 8, wherein the reflectively-terminated input stripline transmission wire is in a layer of a stack of layers of the attenuator.

11. The attenuator of claim 10, wherein the output stripline transmission wire is in another layer of the stack of layers that is adjacent to the layer comprising the reflectively-terminated input stripline transmission wire.

12. The attenuator of claim 11, wherein the layer and the other layer are between two ground plane layers of the stack of layers.

13. A method of forming a cable, comprising:
providing an output line within the cable, wherein an end of the output line nearest to a first end of the cable is terminated to ground by at least one resistive load; and
broadside-coupling the output line to a reflectively-terminated input line within the cable, wherein an end of the reflectively-terminated input line nearest to a second end of the cable is shorted to ground, and wherein the second end is different from the first end.

14. The method of claim 13, wherein the output line exhibits a non-looped-back layout.

15. The method of claim 13, wherein the cable is a flexible cable.

16. The method of claim 13, wherein the reflectively-terminated input line is in a layer of a stack of layers of the cable.

17. The method of claim 16, wherein another end of the output line nearest to the second end of the cable is coupled to a device.

18. The method of claim 16, wherein the output line is in another layer of the stack of layers that is adjacent to the layer comprising the reflectively-terminated input line.

19. The method of claim 18, wherein the layer and the other layer are between two ground plane layers of the stack of layers.

20. A method of forming an attenuator, comprising:
forming a stack of layers of the attenuator, comprising:
an output stripline transmission wire, wherein an end of the output line nearest to a first end of the attenuator is terminated to ground by at least one resistive load; and
a reflectively-terminated input stripline transmission wire that is broadside-coupled to the output stripline transmission wire, wherein an end of the reflectively-terminated input stripline transmission wire nearest to a second end of the attenuator is shorted to ground, and wherein the second end is opposite from the first end.

21. The method of claim 20, wherein the output stripline transmission wire exhibits a non-looped-back layout.

22. The method of claim 20, wherein the attenuator is in a flexible cable.

23. The attenuator of claim 20, wherein forming the stack of layers further comprises:
forming a first layer comprising a first ground layer;
forming a second layer adjacent to the first layer, wherein the second layer comprises the output stripline transmission wire;
forming a third layer adjacent to the second layer, wherein the third layer comprises the reflectively-terminated input stripline transmission wire; and
forming a fourth layer adjacent to the third layer, wherein the fourth layer comprises a second ground plane.

24. The method of claim 20, wherein the reflectively-terminated input stripline transmission wire is in a layer of a stack of layers of the attenuator.

25. The method of claim 24, wherein the output stripline transmission wire is in another layer of the stack of layers that is different from the layer comprising the reflectively-terminated input stripline transmission wire.

* * * * *